US 8,635,490 B2

(12) United States Patent
Narayanaswamy et al.

(10) Patent No.: US 8,635,490 B2
(45) Date of Patent: *Jan. 21, 2014

(54) HIGH AVAILABILITY FOR NETWORK SECURITY DEVICES

(71) Applicant: Juniper Networks, Inc., Sunnyvale, CA (US)

(72) Inventors: Krishna Narayanaswamy, San Jose, CA (US); Rajiv Ranjan, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/651,895

(22) Filed: Oct. 15, 2012

(65) Prior Publication Data
US 2013/0042323 A1 Feb. 14, 2013

Related U.S. Application Data

(63) Continuation of application No. 12/684,725, filed on Jan. 8, 2010, now Pat. No. 8,291,258.

(51) Int. Cl.
G06F 11/00 (2006.01)
G06F 11/20 (2006.01)

(52) U.S. Cl.
USPC ............................ 714/4.11; 714/4.1; 709/224

(58) Field of Classification Search
USPC .................. 714/4.11, 4.12, 4.2; 709/223, 224; 726/22, 23
See application file for complete search history.

(56) References Cited

U.S. PATENT DOCUMENTS

| 6,397,259 | B1 | 5/2002 | Lincke et al. |
| 7,020,709 | B1 | 3/2006 | Sloss |
| 7,055,053 | B2 | 5/2006 | Saika |
| 7,316,031 | B2 | 1/2008 | Griffith et al. |
| 7,734,752 | B2 | 6/2010 | Zuk et al. |
| 7,773,540 | B1 | 8/2010 | Zatko |
| 7,957,323 | B2 | 6/2011 | Uyehara et al. |
| 2003/0101359 | A1 | 5/2003 | Aschen et al. |
| 2005/0188423 | A1 | 8/2005 | Motsinger et al. |
| 2006/0155997 | A1 | 7/2006 | Fritzges et al. |
| 2008/0263665 | A1 | 10/2008 | Ma et al. |
| 2011/0078783 | A1 | 3/2011 | Duan et al. |

OTHER PUBLICATIONS

U.S. Appl. No. 11/835,923, by Bryan Burns, filed Aug. 8, 2007.
U.S. Appl. No. 11/937,163, by Siying Yang, filed Nov. 8, 2007.

(Continued)

Primary Examiner — Joseph Schell
(74) Attorney, Agent, or Firm — Shumaker & Sieffert, P.A.

(57) ABSTRACT

In one example, a backup intrusion detection and prevention (IDP) device includes one or more network interfaces to receive a state update message from a primary IDP device, wherein the state update message indicates a network session being inspected by the primary IDP device and an identified application-layer protocol for the device, to receive an indication that the primary device has switched over or failed over to the backup device, and to receive a plurality of packets of the network session after receiving the indication, each of the plurality of packets comprising a respective payload including application-layer data, a protocol decoder to detect a beginning of a new transaction from the application-layer data of one of the plurality of packets, and a control unit to statefully process only the application-layer data of the network session that include and follow the beginning of the new transaction.

23 Claims, 8 Drawing Sheets

(56) References Cited

OTHER PUBLICATIONS

U.S. Appl. No. 12/432,325, by Bryan Burns, filed Apr. 29, 2009.
U.S. Appl. No. 12/568,319, by Qingming Ma, filed Sep. 28, 2009.
RFC 793—Transmission Control Protocol, DARPA Internet Program, prepared by Information Sciences Institute, University of Southern California, Sep. 1981, 67 pp.
Translation and original Notification of the First Office Action mailed Mar. 29, 2013 in corresponding CN Application No. 201010503151.0, 9 pgs.

US 8,635,490 B2

HIGH AVAILABILITY FOR NETWORK SECURITY DEVICES

This application is a continuation of U.S. application Ser. No. 12/684,725, filed Jan. 8, 2010, which is hereby incorporated by reference in its entirety.

TECHNICAL FIELD

This disclosure relates to computer networks and, more particularly, to security devices used within computer networks.

BACKGROUND

The goal of high availability computer network environments is to provide users and other entities with "always on" service. That is, high availability computer network environments should provide reliable, continuous operation service. To accomplish this, network devices in a high availability environment perform error detection and implement recoverability for detected errors. Unfortunately, network devices occasionally fail. For example, a software or hardware problem or a power fault within a security device may cause all or a portion of the security device to stop functioning.

When a network device fails, all network traffic flowing through the failed network device may cease. For an enterprise that depends on such network traffic, this may be unacceptable, even if this failure occurs only for a short time. To minimize the possibility of a failure causing all network traffic to cease, redundant hardware such as a backup controller or a separate backup network device may be installed. Thus, if the network device that has primary responsibility for performing the security services (i.e., the master device) fails, the backup device may be quickly substituted for the master device. In other words, the failing network device "fails over" to the backup device. A master device may also "switch over" to the backup device to go offline temporarily, e.g., to install software and/or firmware updates or to undergo other routine maintenance procedures. In general, failover is considered a form of switchover. After failing over or switching over to the backup device, the backup device becomes the master device. High availability clusters often include such primary and backup network devices.

An intrusion detection and prevention (IDP) device inspects application layer (that is, OSI Layer Seven) data to attempt to detect malicious traffic. In general, IDP devices execute one or more complex finite automata or algorithms, using the application layer data as input, to detect patterns and event sequences that are indicative of malicious traffic. This complex detection process often requires generation and maintenance of substantial state information that describes the current traffic patterns and events of the current application-layer session. The substantial state information often prohibits the effective use of high availability with respect to IDP devices.

SUMMARY

In general, this disclosure describes techniques for achieving high-availability intrusion detection and prevention (IDP) devices within a computer network. For example, techniques are described for synchronizing application-layer IDP state information between an active IDP device and a backup IDP device in a high availability environment. This disclosure also describes techniques for performing failover from the active IDP device to the backup IDP device. The synchronization of application-layer IDP state information between the active IDP device and the backup IDP device occurs such that, upon failover to the backup IDP device from the active IDP device, the backup IDP device is able to meaningfully apply IDP services to existing application layer communication sessions that were previously being inspected by the active IDP device. However, these techniques avoid replicating each packet of a packet flow from the active IDP device to the backup IDP device, in order to prevent overburdening the active and backup IDP devices.

The techniques of this disclosure include synchronizing application-layer IDP state for application-layer events, such as creation of a new layer seven communication session, deletion of an existing session, blocking of an existing session, and/or identification of an application (or application-layer protocol) for the communication session. In this manner, the active IDP device informs the backup IDP device of an application (or application-layer protocol) that has been identified for a new packet flow within the network. When the active IDP device fails over to the backup IDP device, the backup IDP device anchors a protocol decoder that is selected according to the application previously identified by the active IDP device prior to fail over. For example, the backup IDP device anchors its protocol decoder at the start of a new application-layer transaction within the communication session. In general, a "transaction" refers to a bounded series of related application-layer communications between peer devices. For example, a single TCP connection can be used to send (receive) multiple HyperText Transfer Protocol (HTTP) requests (responses). As one example, a single web-page comprising multiple images and links to HTML pages may be fetched using a single TCP connection. An HTTP decoder may be invoked by IDP device to identify each request/response within the TCP connection as a different transaction. This may be useful to anchor and apply attack definitions or attack patterns based on transaction boundaries. The backup IDP device may differentiate between transactions within the application-layer data of the packet flow by detection of delimiters (e.g., for ASCII-based transactions), or based on defined lengths (e.g., for binary-based or length-encoded transactions).

Upon failover, the backup IDP device attempts to identify the beginning of a new transaction within the application-layer data of a packet flow that was previously inspected by the active IDP device. The backup IDP device begins inspecting the application-layer data upon discovering the new transaction. In some examples, the backup IDP device scans the application-layer data to identify a delimiter that identifies the end of a current application-layer transaction and the beginning of a new transaction. Many ASCII-based application-layer protocols utilize delimiters, for example, new line/line feed characters such as '\n' and '0x0A' and carriage return characters such as '\r' and '0x0D', to signal the transition between two transactions. Some length-encoded protocols define a particular bit pattern as a delimiter. In examples utilizing such delimiters, the backup IDP device scans for the delimiter and begins actively inspecting application-layer data following the delimiter.

In still other examples, some length-encoded application-layer protocols define a length value (e.g., number of bytes) for a transaction. In examples using a length value for transactions, the active IDP device additionally synchronizes with the backup IDP device data that identifies the end of a current transaction/start of a new transaction based on TCP sequence numbers. As one example, the active IDP device, upon detecting a new transaction within the application-layer data of a communication session, may calculate a TCP sequence number that corresponds to the start of the next transaction and sends the calculated TCP sequence number to the backup IDP device. Upon failover, the backup IDP device anchors the application-layer protocol decoder previously identified primary IDP device and uses the application-layer protocol decoder to actively inspect the application-layer of packets having a sequence number that is at least as large as the latest TCP sequence number received from the active IDP device.

In one example, a method includes receiving, with a backup network device of a high-availability cluster, a state update message from a primary network device of the high-availability cluster, wherein the state update message indicates a network session being inspected by the primary network device and an identified application-layer protocol for the network session, receiving, with the backup network device, an indication that the primary device has switched over or failed over to the backup network device, after receiving the indication, receiving, with the backup network device, a plurality of packets of the network session, each of the plurality of packets comprising a respective payload including application-layer data, detecting a beginning of a new transaction from the application-layer data of one of the plurality of packets, and processing the application-layer data of the plurality of packets of the network session that include and follow the one of the plurality of packets that corresponds to the beginning of the new transaction without performing stateful processing of the application-layer data of packets that precede the beginning of the new transaction. Although some processing of the application-layer data of packets that precede the beginning of the new transaction may be performed, e.g., stateless processing, stateful processing begins only for transactions including and following the new transaction.

In another example, a backup network device of a high-availability cluster configured to operate in a cluster mode includes one or more network interfaces to receive a state update message from a primary network device of a high-availability cluster of the backup network device, wherein the state update message indicates a network session being inspected by the primary network device and an identified application-layer protocol for the device, to receive an indication that the primary device has switched over or failed over to the backup network device, and to receive a plurality of packets of the network session after receiving the indication, each of the plurality of packets comprising a respective payload including application-layer data, a protocol decoder to detect a beginning of a new transaction from the application-layer data of one of the plurality of packets, and a control unit to process the application-layer data of the plurality of packets of the network session that include and follow the one of the plurality of packets that corresponds to the beginning of the new transaction without performing stateful processing of the application-layer data of packets that precede the beginning of the new transaction.

In another example a computer-readable storage medium is encoded with instructions for causing a programmable processor of a backup network device of a high availability cluster to receive a state update message from a primary network device of the high-availability cluster, wherein the state update message indicates a network session being inspected by the primary network device and an identified application-layer protocol for the session, receive an indication that the primary device has switched over or failed over to the backup network device, receive a plurality of packets of the network session after receiving the indication, each of the plurality of packets comprising a respective payload including application-layer data, detect a beginning of a new transaction from the application-layer data of one of the plurality of packets, and process the application-layer data of the plurality of packets of the network session that include and follow the one of the plurality of packets that corresponds to the beginning of the new transaction without performing stateful processing of the application-layer data of packets that precede the beginning of the new transaction.

In another example, a method includes receiving, with a primary network device in a high availability environment, a plurality of packets of a network session, each of the plurality of packets comprising a respective payload including application-layer data, detecting a beginning of a new transaction from the application layer of one of the plurality of packets, calculating a sequence number corresponding to a first packet of a next transaction of the network session, wherein the next transaction follows the new transaction, constructing a state update message that includes the calculated sequence number, and forwarding the state synchronization message to a backup network device for the primary network device in the high availability environment.

In another example, a primary network device of a high availability cluster configured to operate in a cluster mode includes one or more network interfaces to receive a plurality of packets of a network session, each of the plurality of packets comprising a respective payload including application-layer data, and forward state synchronization messages to a backup network device for the primary network device in the high availability cluster, a protocol decoder module to detect a beginning of a new transaction from the application-layer data of one of the plurality of packets, and a flow management module to calculate a sequence number corresponding to a first packet of a next transaction of the network session, wherein the next transaction follows the new transaction, and construct a state update message that includes the calculated sequence number.

In another example, a computer-readable storage medium is encoded with instructions for causing a programmable processor of a primary network device of a high availability cluster to receive a plurality of packets of a network session, each of the plurality of packets comprising a respective payload including application-layer data, detect a beginning of a new transaction from the application layer of one of the plurality of packets, calculate a sequence number corresponding to a first packet of a next transaction of the network session, wherein the next transaction follows the new transaction, construct a state update message that includes the calculated sequence number, and forward the state synchronization message to a backup network device for the primary network device in the high availability environment.

In another example, a high-availability cluster system includes a primary network device and a backup network device. The primary network device includes one or more network interfaces to receive a first plurality of packets of a network session, each of the first plurality of packets comprising a respective payload including application-layer data, and forward state synchronization messages to the backup network device, and a flow management module to detect a beginning of a new transaction from the application layer of one of the first plurality of packets, calculate a sequence number corresponding to a first packet of a next transaction of the network session, wherein the next transaction follows the current transaction, and construct a state update message that includes the calculated sequence number. The backup network device includes one or more network interfaces to receive the state update message from the primary network device, receive an indication that the primary device has switched over or failed over to the backup network device, and to receive a second plurality of packets of the network session, each of the second plurality of packets comprising a respective payload including application-layer data, a protocol decoder module to detect a beginning of a new transaction from the application-layer data of one of the second plurality of packets, and a control unit to process the application-layer data of the second plurality of packets of the network session that include and follow the one of the second plurality of packets that corresponds to the beginning of the next transaction without performing stateful processing of the application-layer data of packets that precede the beginning of the next transaction.

The techniques of this disclosure may provide one or more advantages. For example, the techniques of this disclosure provide a lightweight mechanism for synchronizing application-layer IDP state between high-availability IDP devices to allow for on-going IDP inspection for existing network sessions following failover in a high-availability environment. The techniques scale well to systems that may inspect large volumes (e.g., millions) of application-layer communication sessions, as the communication required between the primary IDP device and the backup network device is minimal. Because synchronization of application-layer IDP state occurs between the primary and the backup IDP devices, the backup network device is able to perform stateful deep packet inspection for existing communication session following switchover or failover from the primary IDP device. In this manner, the backup IDP device is able to statefully process (e.g., inspect) subsequent application-layer transactions carried in the network sessions following switchover or failover.

The details of one or more examples are set forth in the accompanying drawings and the description below. Other features, objects, and advantages will be apparent from the description and drawings, and from the claims.

DETAILED DESCRIPTION

Figure 1:
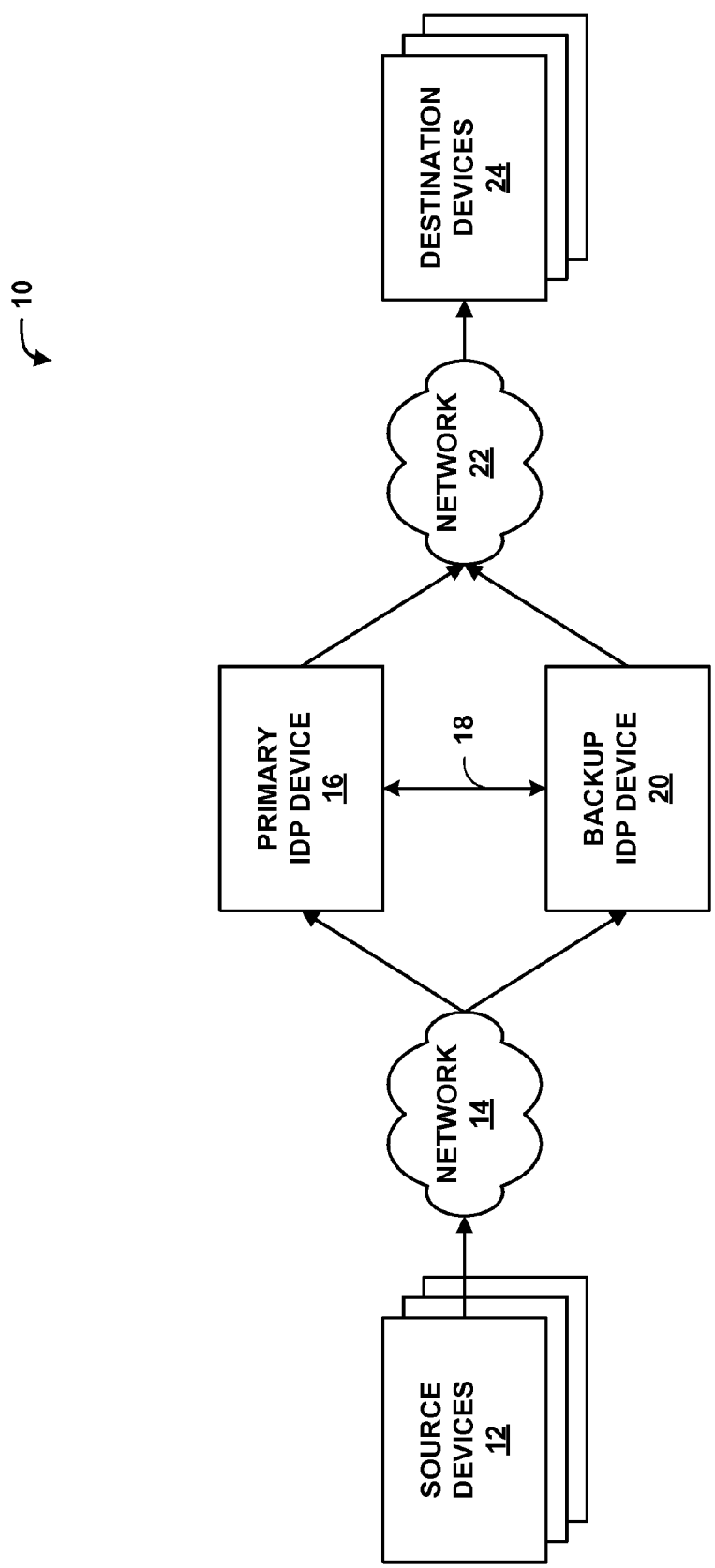
FIG. 1 is a block diagram illustrating an example system in which a primary intrusion detection and prevention (IDP) device synchronizes application-layer IDP state with a backup IDP device for packet flows between source devices and destination devices.

FIG. 1 is a block diagram illustrating an example in which primary intrusion detection and prevention (IDP) device 16 and backup IDP device 20 provide effective high-availability IDP services within computing environment 10. As described herein, primary IDP device 16 and backup IDP device 20 synchronize application-layer IDP state for intercepted network sessions that flow between source devices 12 and destination devices 24. In general, primary IDP device 16 performs stateful inspection of application-layer data for packet flows between source devices 12 and destination devices 24. Each of source devices 12 may establish an application-layer communication session with one or more of destination devices 24, where each communication session typically comprises a pair of packet flows between the source devices and the destination devices.

The term "packet flow" refers to a set of packets originating from a particular one of source devices 12 and sent to a particular one of destination devices 24 as part of an application-layer network session between the one of source devices 12 and the one of destination devices 24, where each flow is typically identified by a five-tuple of source IP address, destination IP address, source port, destination port, a transport-layer protocol (e.g., TCP, UDP or the like). Similarly, a set of packets originating from a particular one of destination devices 24 and sent to a particular one of source devices 12 as part of a corresponding network session also forms a packet flow. Source devices 12 are also referred to as "clients" and destination devices 24 are also referred to as "servers," in some contexts. In general, a network session comprises two packet flows between two devices, each of the packet flows being in opposite directions.

In the example of FIG. 1, source devices 12 are coupled to primary IDP device 16 and backup IDP device 20 via network 14, and primary IDP device 16 and backup IDP device 20 are coupled to destination devices 24 via network 22. In other examples, any or all of source devices 12 may be coupled to primary IDP device 16 and backup IDP device 20 directly or through other networks similar to network 14. In general, network 14 and network 22 typically include one or more network devices, such as, for example, routers, switches, bridges, gateways, hubs, or security devices. Primary IDP device 16 and backup IDP device 20 are also coupled via data link 18. In the example of FIG. 1, primary IDP device 16 and backup IDP device 20 are directly coupled via data link 18. In other examples, however, primary IDP device 16 and backup IDP device 20 are coupled via intermediate network devices.

For purposes of explanation, it is assumed that network 14 includes a router or switch that directs traffic to primary IDP device 16 and/or backup IDP device 20. In one example, a switch at the edge of network 14 directs packet flows to primary IDP device 16 while primary IDP device 16 remains active. When primary IDP device 16 switches over or fails over to backup IDP device 20, the switch updates forwarding information such that network traffic is directed to backup IDP device 20, instead of primary IDP device 16. Primary IDP device 16 may restart, recover from an error, be replaced, or otherwise become active again, in which case primary IDP device 16 becomes active and primary, after which backup IDP device 20 reverts to acting as a backup, rather than as the primary. Accordingly, after primary IDP device 16 becomes active again, the switch again updates the forwarding information such that network traffic is directed to primary IDP device 16, rather than backup IDP device 20.

Primary IDP device 16 and backup IDP device 20 form a high availability cluster. Accordingly, primary IDP device 16 and backup IDP device 20 are configured in "cluster mode." In general, traffic that passes through a high-availability cluster establishes an active session on a primary node, e.g., primary IDP device 16, and the primary node establishes a backup session on a backup node, e.g., backup IDP device 20, and synchronizes the active session to the backup node. The term "high availability" generally refers to network devices or services that are "always on," that is, that are reliable, provide error detection and recoverability, and provide continuous operation. In the example of FIG. 1, backup IDP device 20 performs as a primary IDP device when primary IDP device 16 encounters an error or otherwise goes offline. That is, primary IDP device 16 fails over or switches over to backup IDP device 20, in the event of an error or an event that causes primary IDP device 16 to go offline. For example, primary IDP device 16 may switchover to backup IDP device 20 to perform a software update that requires a restart of primary IDP device 16.

In some examples, primary IDP device 16 sends application-layer IDP state data for packet flows (e.g., synchronization messages) and control messages (e.g., heartbeat or keepalive messages) to backup IDP device 20 via different links between primary IDP device 16 and backup IDP device 20. These links may comprise separate physical links or separate logical links over the same physical medium. In some examples, backup IDP device 20 determines that primary IDP device 16 is still active by receiving periodic keepalive messages. Accordingly, when backup IDP device 20 does not receive a keepalive message from primary IDP device 16 after a period of time, backup IDP device 20 determines that primary IDP device 16 is no longer active, and so backup IDP device 20 becomes active, treating the failure of primary IDP device 16 to send an expected keepalive message as a failover event.

As stated above, primary IDP device 16 and backup IDP device 20 perform stateful inspection of application-layer data of packet flows between source devices 12 and destination devices 24. That is, primary IDP device 16 executes application-layer protocol decoders that process application-layer communications and output transaction data that identifies application-layer transactions. In particular, the transaction data indicates when a series of related application-layer communications between two peer devices start and end. Primary IDP device 16 then applies intrusion detection algorithms such as signature matching using deterministic finite automaton (DFA) or other algorithms to each transaction to detect acceptable and unacceptable application layer data. In some examples, primary IDP device 16 and backup IDP device 20 comprise particular DFAs for each type of application-layer protocol that can be inspected by IDP devices.

In some examples, the DFA begins in a start state for application layer components of transactions of an application of a packet flow, such that upon reaching the end of a component, the IDP device determines whether the end state of the DFA corresponds to an accept state, a non-threat state, an attack state, or other state that indicates whether the transaction indicates that the packet flow is malicious. The DFAs may be referred to herein as "application layer component-based DFAs" in that, when applied, each DFA may begin at a start state upon detecting a beginning of an application-layer component of a transaction and be configured to resolve to either an acceptable state or unacceptable state before or upon reaching the completion of that same application-layer component of the transaction within the application-layer data being processed.

In other words, at least some of the detection algorithms applied by the DFAs may be configured to be compartmentalized on a per-transaction basis so as not to cross application-layer transaction boundaries. This may assist with the anchoring and processing of existing packet flows upon failover to backup IDP device 20. The use of DFAs to detect network attacks is discussed in greater detail in U.S. application Ser. No. 12/568,319, "NETWORK TRAFFIC PATTERN MATCHING USING ADAPTIVE DETERMINISTIC FINITE AUTOMATA," Ma et al., filed Sep. 28, 2009, and U.S. application Ser. No. 11/738,059, "NETWORK ATTACK DETECTION USING PARTIAL DETERMINISTIC FINITE AUTOMATON PATTERN MATCHING," Ma et al., filed Apr. 20, 2007, each of which are hereby incorporated by reference in their respective entireties.

Primary IDP device 16 is configured to detect new communication sessions between source devices 12 and destination devices 24 and, for each communication session, determine an application-layer protocol for the session inspecting the initial packets of the packet flow, e.g., using protocol decoders and/or application identification techniques. Example application identification techniques are discussed in U.S. patent application Ser. No. 12/432,325, Burns et al., "DETECTING MALICIOUS NETWORK SOFTWARE AGENTS," filed Apr. 29, 2009, U.S. patent application Ser. No. 11/937,163, Yang et al., "Multi-layered Application Classification and Decoding," filed Nov. 8, 2007, and U.S. patent application Ser. No. 11/835,923, Burns et al., "Identifying Applications for Intrusion Detection Systems," filed Aug. 8, 2007, each of which are hereby incorporated by reference in their respective entireties.

In general, primary IDP device 16 sends relatively few application-layer IDP state update messages to backup IDP device 20 yet provide high-availability IDP services to existing communication sessions, i.e., communication sessions established prior to failover, as well as new sessions. In one example, primary IDP device 16 sends application-layer IDP state update messages to backup IDP device 20 for session events, such as creation of a new network session (e.g., when primary IDP device 16 identifies a previously unmonitored packet flow), deletion of an existing network session (e.g., upon detecting a close session message), and blocking of an existing network session (e.g., when primary IDP device 16 determines that a network session or packet flow thereof is malicious). In some examples, e.g., where an identified application-layer protocol is length-encoded and has transactions that are of a defined length, primary IDP device 16 sends state updates to backup IDP device 20 for each transaction, to inform backup IDP device 20 of a marker, e.g., a TCP sequence number, that signals when a next application-layer transaction will begin in the packet flow. For example, a layer four TCP sequence number can be calculated by adding the length of the current transaction to the sequence number of the beginning of the current transaction, plus the lengths of other packet headers as necessary.

Upon identifying an application-layer protocol used for a communication session, primary IDP device 16 sends an application-layer IDP state update message to backup IDP device 20 to record the new session. Primary IDP device 16 treats the act of identifying an application-layer protocol that is in use for a packet flow as an initial session event for the IDP services. At this time, primary IDP device 16 sends a state update message to backup IDP device 20 that identifies the packet flow and includes an identification of the application-layer protocol associated with the packet flow. In some examples, following failover or switchover, backup IDP device 20 uses the identity of the application-layer protocol specified by primary IDP device 16 to anchor the correct protocol decoder to the packet flow to detect the start of a new application-layer transaction and trigger commencement of renewed application-layer IDP services for the packet flow. For example, assuming that primary IDP device 16 determines that the application-layer protocol for the packet flow comprises HTTP, backup IDP device 20 may look for the beginning of a new HTTP request, e.g., a GET, HEAD, or POST request. Following failover, and upon detecting the end of a current transaction and the start of a new transaction, backup IDP device 20 begins inspecting application-layer data associated with a subsequent application-layer transaction. Although backup ID device 20 may perform some processing (e.g., stateless processing) of the application-layer data of packets that precede the beginning of the new transaction, backup IDP device 20 begins stateful processing only for transactions including and following the new transaction.

The techniques of this disclosure may prevent a restart of network sessions associated with packet flows being inspected by primary IDP device 16 upon a switchover or failover to backup IDP device 20, thereby allowing the IDP devices to achieve improved high-availability IDP services. Further, the high-availability IDP services may be achieved without requiring that primary IDP device 16 replicate each received packet of each packet flow to backup IDP device 20, which would consume far too many network and computational resources in high-volume networks. In one example, primary IDP device 16 informs backup IDP device 20 of identified application-layer protocols for newly detected communication sessions, and backup IDP device 20 begin inspecting packet flows following switchover or failover of primary IDP device 16 by anchoring an appropriate protocol decoder to an existing packet flow and synchronizing attack detection to the start of a new, subsequent transaction. In some examples, these techniques also include primary IDP device 16, upon detecting a new application-layer transaction, informing backup IDP device 20 of a TCP sequence number or other marker that may be used as an aid by the backup IDP device to predict the start of the next transaction.

Primary IDP device 16 sends application-layer IDP state update messages to backup IDP device 20 via data link 18 for a particular packet flow when primary IDP device 16 detects the end of a current transaction. The end of a transaction is signaled in different ways, in various examples. Primarily, the end of a transaction is signaled either by the presence of a delimiter value, such as a new line character, a line feed character, a carriage return character, or some combination thereof, or by having transactions of a particular length. Examples of new line and line feed characters include '\n' and '0×0A'. Examples of carriage return characters include '\r' and '0×0D'. Other characters can also be used as delimiters to designate the end of a transaction. In general, delimiters that designate the end of a transaction are defined according to an application and/or application-layer protocol. Accordingly, primary IDP device 16 and backup IDP device 20 are configured to recognize delimiters corresponding to application-layer protocols and applications that are recognized by primary IDP device 16 and backup IDP device 20.

When the end of a transaction is signaled by a delimiter value, primary IDP device 16 does not need to send messages to backup IDP device 20 for each transaction. Instead, primary IDP device 16 can simply send application-layer IDP state messages for each network session event, such as a create, delete, block, or application identification event. When transactions are of a defined length, however, primary IDP device 16 informs backup IDP device 20 of TCP sequence numbers that indicate the start of a next transaction.

In particular, primary IDP device 16 calculates the TCP sequence number corresponding to the next transaction as the sum of the TCP sequence number of the first packet of a current transaction, the length of the transaction, and any additional length added by packet headers not represented by the application layer payload of packets of the transaction.

When primary IDP device 16 determines the length of a transaction, primary IDP device 16 constructs an application-layer IDP state synchronization message including a sequence number corresponding to the start of a next transaction and forwards the state synchronization message to backup IDP device 20. Backup IDP device 20, in turn, updates state information for the packet flow in response to the state synchronization message.

Although described primarily with respect to stateful IDP devices for the purposes of explanation, the techniques of this disclosure can be applied to any pair of primary/backup network elements in which sequence number awareness is needed. For example, other security devices, such as intrusion detection or intrusion prevention devices, Data Loss Prevention devices, and Web Security gateways, may perform the techniques of this disclosure. As another example, devices configured to perform uniform resource locator (URL) filtering can also be configured to perform the techniques of this disclosure. In general, any pair of devices in a high availability configuration that utilize protocol decoders can be configured to perform the techniques of this disclosure.

Rather than inspecting only new packet flows of new sessions following a switchover or failover, the techniques of this disclosure provide backup IDP device 20 with the ability to perform stateful inspection of packets of an existing packet flow following a switchover or failover. In particular, backup IDP device 20 uses the application-layer IDP state update messages received from primary IDP device 16 prior to a switchover or failover to determine when a new transaction of the packet flow begins, and backup IDP device 20 begins inspecting the packet flow at the new transaction and each subsequent transaction of the packet flow.

Following switchover or failover, backup IDP device 20 enters an "anchor mode" in which backup IDP device 20 searches for the beginning of a next transaction of a packet flow. Backup IDP device 20 inspects packets of the packet flow to detect either a delimiter representative of a new transaction, or a packet having a TCP sequence number that is equal to a TCP sequence number received from primary IDP device 16 indicative of a new transaction. In either case, backup IDP device 20 attempts to detect a packet representative of a last packet of a current transaction and/or a first packet of a new transaction to anchor a protocol decoder for the packet flow and begin inspecting the packet flow to determine whether the packet flow represents a network attack.

In general, a packet flow comprises a plurality of packets. Each of the plurality of packets may correspond to a particular transaction of the packet flow. In some examples, one or more of the plurality of packets may correspond to a delimiter that is used to differentiate between two transactions. That is, each transaction of a packet flow may be followed by a delimiter to indicate a distinction between the transaction and a following transaction. In such examples, determining that at least one of a plurality of packets corresponds to a first packet of a new transaction includes determining that the packet immediately following a delimiter corresponds to the first packet of the transaction.

Alternatively, transactions may be defined to comprise a fixed number of bytes, described as a length of a transaction. In some examples, each transaction of a packet flow has the same length, whereas in other examples, each transaction includes a length value in a transaction header that describes the length of the transaction, e.g., a number of bytes for the transaction. In either case, determining that at least one of a plurality of packets corresponds to the first packet of a transaction includes determining that the packet has a TCP sequence number that is equal to a largest TCP sequence number received from primary IDP device 16 that indicates the start of a new transaction. Alternatively, in some examples, primary IDP device 16 sends a message that includes the TCP sequence number of the first packet of a new transaction, as well as a length of the transaction, and allows backup IDP device 20 to calculate the sequence number of the first packet of a next transaction. Packet synchronization numbers correspond to particular bytes of the packet flow, and therefore, the difference between the synchronization number of a first packet of a transaction and the synchronization of a last packet of the transaction corresponds to the length of the transaction. In this manner, the first packet of a next transaction can be identified by calculating the difference between the sequence number of a received packet and the sequence number of the first packet of a transaction and, when the difference is equal to the transaction length, determining that the received packet is the first packet of the next transaction.

The techniques of this disclosure are described with respect to a single packet flow, for purposes of explanation. However, it should be understood that, in general, primary IDP device 16 inspects packets of a plurality of packet flows. Therefore, the techniques described in this disclosure may be applied to any number of packet flows.

System 10 of FIG. 1 may provide several advantages. For example, configuration of primary IDP device 16 and backup IDP device 20 provide a lightweight mechanism for synchronizing session state and for continuing IDP inspection for network sessions following failover or switchover from primary IDP device 16 and backup IDP device 20 in the example high-availability environment of system 10. The techniques implemented by primary IDP device 16 and backup IDP device 20 scale well to systems that inspect various numbers of packet flows, as the communication required between primary IDP device 16 and backup IDP device 20 is minimal to maintain session synchronization. Because state synchronization occurs between primary IDP device 16 and backup IDP device 20, backup IDP device 20 is able to perform stateful packet inspection following switchover or failover from primary IDP device 16. In this manner, backup IDP device 20 is able to inspect packets of a new transaction as well as subsequent packets of the packet flows previously inspected by primary IDP device 16 following switchover or failover.

Figure 2:
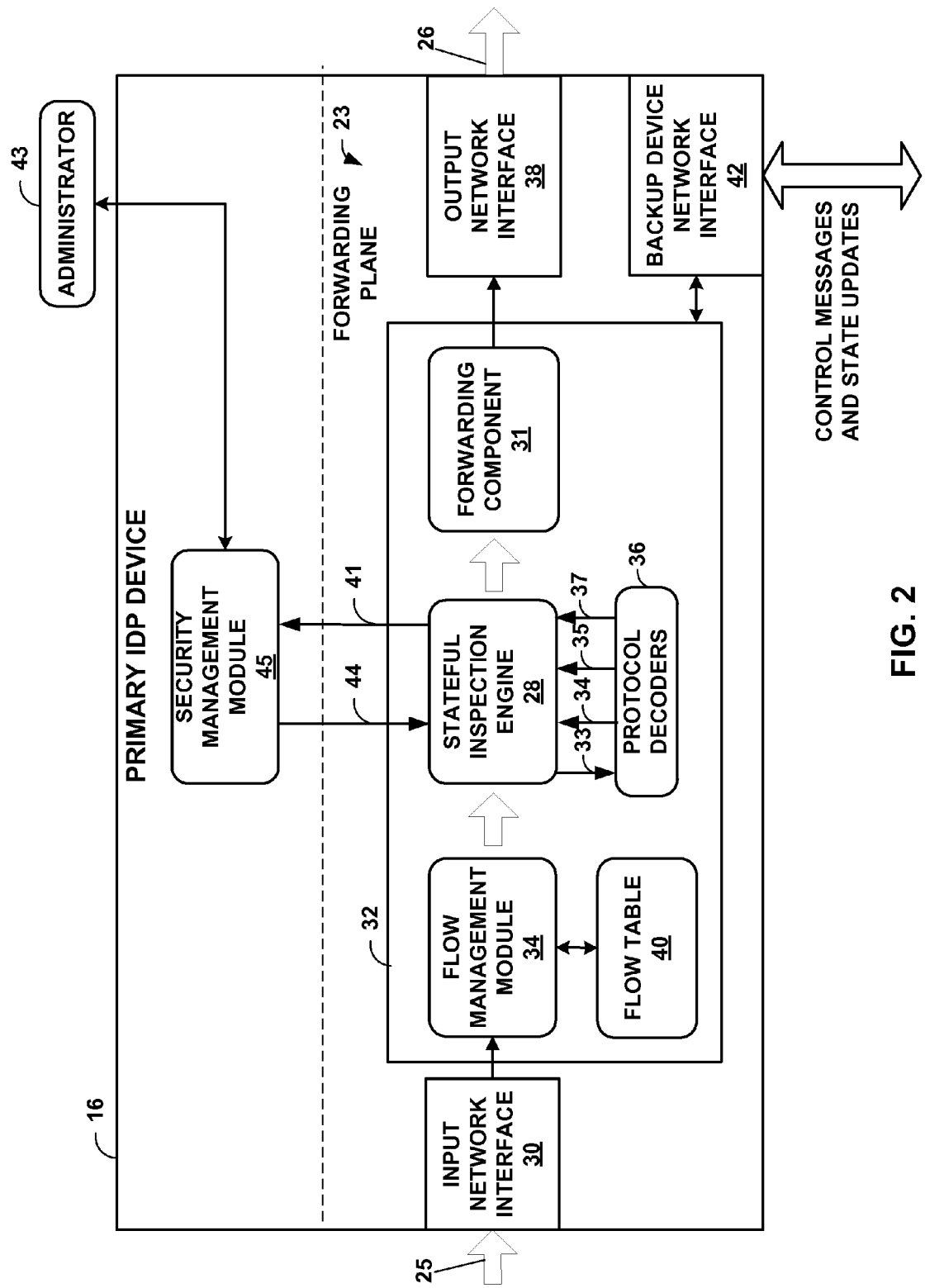
FIG. 2 is a block diagram illustrating an example arrangement of components of a primary IDP device.

FIG. 2 is a block diagram illustrating an example arrangement of components of primary IDP device 16 (FIG. 1). Backup IDP device 20 may include components similar to those described with respect to FIG. 2. In the example of FIG. 2, primary IDP device 16 comprises input network interface 30, control unit 32, flow management module 34, stateful inspection engine 28, protocol decoders 36, forwarding component 31, output network interface 38, flow table 40, backup network device interface 42, and security management module 45. Although three distinct network interfaces are depicted in the example of FIG. 2, other examples may include a single network interface that performs the functions attributed to input network interface 30, output network interface 38, and/or backup device network interface 42.

Security management module 45 presents a user interface by which administrator 43 configures primary IDP device 16. For example, administrator 43 may configure primary IDP device 16 to monitor particular subnets of the enterprise network. In addition, security management module 45 presents a user interface by which administrator 43 may specify attack definitions 44, which security management module 45 relays to stateful inspection engine 28. In one example, attack definitions 44 comprise compound attack definitions. Moreover, security management module 45 may present a user interface by which administrator 43 may modify assumptions regarding packet flow characteristics, such as the highest priority packet flows for monitoring, port bindings for applications, or other features of determining a type of application and protocol associated with the packet flow.

In the illustrated example, primary IDP device 16 includes a forwarding plane 23 that transparently monitors inbound network traffic 25 and forwards the network traffic as outbound network traffic 26. In the example illustrated by FIG. 2, forwarding plane 23 includes input network interface 30, flow management module 34, stateful inspection engine 28, a plurality of protocol decoders 36, forwarding component 31, output network interface 38, and backup device network interface 42.

Primary IDP device 16 comprises control unit 32 that executes flow management module 34 and protocol decoders 36. Control unit 32 may comprise any combination of hardware, firmware, and/or software for performing the functions attributed to control unit 32. For example, control unit 32 may comprise a programmable processor that executes instructions stored in a computer-readable storage medium. Primary IDP device 16 may comprise a computer-readable storage medium encoded with instructions for flow management module 34 and/or protocol decoders 36. Alternatively, flow management module 34 and/or protocol decoders 36 may comprise discrete hardware units, such as digital signal processors (DSPs), application specific integrated circuits (ASICs), field programmable gate arrays (FPGAs), or any other equivalent integrated or discrete logic circuitry, or any combination of hardware, firmware, and/or software.

In general, flow management module 34 determines, for packets received via input network interface 30, a packet flow to which the packets belong and characteristics of the packet flow. Flow management module 34 also provides session state updates, e.g., event updates and, for length encoded protocols, sequence number updates, actions taken with respect to a particular network device, packet flow, or network session (e.g., block, rate limit, time to block, etc.), or other state updates, to backup IDP device 20 for each packet flow. For each packet flow, flow management module 34 provides state updates to backup IDP device 20 for each packet flow event. For packet flows corresponding to length-encoded application-layer protocols, primary IDP device 20 provides application-layer IDP state update messages at each new transaction to identify the TCP sequence number corresponding to a first packet of a next transaction.

When a packet flow is first received, flow management module 34 constructs a state update message including information regarding the packet flow that indicates that a new packet flow has begun and is being monitored by primary IDP device 16. The state update message includes information such as, for example, the five-tuple {source IP address, destination IP address, source port, destination port, protocol}, and in some examples, an indication of how transactions are differentiated (e.g., whether defined length transactions or delimiters used to separate transactions, which particular delimiters are used, lengths of transactions, etc.) Flow management module 34 also sends application-layer IDP state update messages when an application corresponding to the packet flow is identified, where the message includes an identification of the application.

Flow management module 34 receives inbound traffic 25 and identifies network flows within the traffic. Each network flow represents a flow of packets in one direction within the network traffic and is identified by at least a source address, a destination address and a communication protocol. Flow management module 34 may utilize additional information to specify network flows, including source media access control (MAC) address, destination MAC address, source port, and destination port. Other examples may use other information to identify network flows, such as IP addresses.

Flow management module 34 maintains data within flow table 40 that describes each active packet flow present within the network traffic. Flow table 40 specifies network elements associated with each active packet flow, i.e., low-level information such as source and destination devices and ports associated with the packet flow. In addition, flow table 40 identifies pairs or groups of packet flows that collectively form a single communication session between a client and server. For example, flow table 40 may designate communication session as pairs of packet flows in opposite directions for flows sharing at least some common network addresses, ports and protocol.

Flow management module 34 maintains flow table 40, which includes parameters of each packet flow monitored by primary IDP device 16. As described in greater detail with respect to the example of FIG. 4 below, flow table 40, in one example, includes entries for each packet flow that include information such as packet flow identifying information, such as the five-tuple {source IP address, destination IP address, source port, destination port, protocol}, an identification of the application corresponding to the packet flow, whether the packet flow is active or blocked, and how transactions are differentiated (e.g., whether delimiters or transaction lengths are used). Flow table 40 generally includes an entry for each packet flow monitored by primary IDP device 16.

When primary IDP device 16 receives a new packet flow, flow management module 34 extracts data from packets forming a three-way handshake of the packet flow to create a new entry in flow table 40. The three-way handshake generally includes a synchronization (SYN) packet from a client to a server, a synchronization-acknowledgement (SYN-ACK) packet from the server to the client, and an acknowledgement (ACK) packet from the client to the server. These packets also include session information, such as an initial sequence numbers for both the client (in the SYN packet) and the server (in the SYN-ACK packet).

Likewise, primary IDP device 16 begins inspecting packets of a new packet flow to identify an application-layer protocol for the packet flow. Upon identifying the protocol, primary IDP device 16 sends an IDP state update message to backup IDP device 20 via backup device network interface, where the IDP state update message identifies the new packet flow and includes an identification of the application-layer protocol that has been identified as used within the payload of the packets. In general, the manner in which transactions are differentiated is defined by the application-layer protocol. In some examples, though, primary IDP device 16 explicitly informs backup IDP device 20 of the manner in which transactions are differentiated, using the state update message that indicates the identified application-layer protocol. In some examples, primary IDP device 16 includes in the state update message indicating the identified protocol whether the manner in which transactions are differentiated includes the use of delimiters, in which case primary IDP device 16 may further indicate which delimiters are used, or the use of defined lengths of transactions, in which case primary IDP device 16 may further indicate the length of each transaction in the state update message or in individual messages for each new transaction.

Flow management module 34 determines whether transactions are defined using delimiters or fixed length sequences of bits/bytes. In examples in which delimiters are used to indicate the separation between transactions, flow management module 34 also determines which delimiters apply to a protocol determined to correspond to the packet flow. In some examples, flow management module 34 determines the manner in which transactions are differentiated for the protocol (e.g., by looking for common delimiters such as new line and carriage return characters), while in other examples, control unit 32 determines how to distinguish transactions from each other based solely on the application-layer protocol identification. Flow management module 34 updates the entry corresponding to a packet flow when parameters for the packet flow change.

Backup IDP device 20 also includes a local flow table similar to flow table 40. When flow management module 34 determines that a received packet forms part of a new packet flow, flow management module 34 sends the extracted information from the three-way handshake packets of the new packet flow (e.g., the packet flow identifying 5-tuple) to backup IDP device 20 via data link 18. Backup IDP device 20 creates a new entry for the new packet flow in the local flow table using data received from flow management module 34 of primary IDP device 16. In some examples, this information also includes the initial sequence number of the packet flow. When backup IDP device 20 receives application-layer IDP state updates from primary IDP device 16, backup IDP device 20 updates a corresponding entry in the local flow table of backup IDP device 20.

When primary IDP device 16 switches over or fails over to backup IDP device 20, backup IDP device 20 begins receiving packets of packet flows previously monitored by primary IDP device 16. Backup IDP device 20 scans received packets of a packet flow to identify the beginning of a new application-layer transaction of the packet flow, e.g., by identifying a transaction delimiter within the application-layer data carried by the payload of the packet. In examples in which application-layer transactions of a packet flow have a defined length in bytes, such as for length-encoded protocols, backup IDP device 20 determines that a packet having a sequence number equal to the sequence number of the last state update message from primary IDP device 16 corresponds to the first packet of a new transaction. When backup IDP device 20 detects the first packet of a new transaction, backup IDP device 20 begins processing the new transaction to detect attacks in subsequent packets of the packet flow. In some examples, backup IDP device 20 forwards packets of the packet flow that are not part of the new application-layer transaction without inspecting these packets. In some examples, backup IDP device 20 drops the packets that are received before the new transaction. In this manner, following switchover or failover, backup IDP device 20 begins in an anchoring mode, awaits the start of a new application-layer transaction, anchors an application-layer protocol decoder to a point in the application-layer data where the new transaction begins, then switches to an attack detection and prevention mode and scans subsequent transactions using application layer component-based DFAs to attempt to identify and prevent malicious network traffic.

As described in further detail below, stateful inspection engine 28 inspects packet flows to identify attacks within the packet flows. In accordance with the techniques of this disclosure, stateful inspection engine 28 inspects the packet flow to detect attacks operating at the application layer for the packet flows. When stateful inspection engine 28 detects an attack, stateful inspection engine 28 executes a programmed response, such as sending alert 41 to security management module 45 or instructing forwarding component 31 to drop packets of the packet flow or to end the network session corresponding to the packet flow. Stateful inspection engine 28 may also rate-limit the packet flow, i.e., throttle network sessions corresponding to detected attacks to a certain bitrate, such as 10 Mbits/second. Attack detection module 52 may also record an identifier of at least one of the network devices participating in the network session in flow table 35 and block future connection requests originating from the recorded identifier. That is, flow management module 34 may receive a connection request, determine that the connection request originates from the identifier recorded in flow table 40, and block the connection request.

In this manner, primary IDP device 16 may block future connection requests from the network device participating in the network session as the programmed response. Forwarding component 31 may also construct a message to send to other network devices, such as other routers or IDP, IDS, or IPS devices, to block or otherwise respond to packet flows from the source network device for which stateful inspection engine 28 detected an attack. Alert 41 may include details such as a source address of the packet flow, an identification of the application corresponding to the packet flow, the scores calculated for the metrics of the network session that led stateful inspection engine 28 to conclude that a particular network session was malicious, or other information regarding the network session.

Primary IDP device 16 may use a minimum data size of the reassembled TCP segments, in addition to the signature, in order to identify applications corresponding to packet flows or encapsulated packet flows. Certain applications require a minimum amount of data, so primary IDP device 16 may distinguish malicious packet flows by determining whether the packet flow contains enough data for the identified protocol. Moreover, primary IDP device 16 may not necessarily recognize every application. In one example, when an application is unknown, primary IDP device 16 may simply forward the packet flow. Other examples take other actions for unidentified applications, however, such as discarding all packets which target unknown applications or applying a default signature to all packet flows associated with unknown application types. Other examples also apply the techniques of this disclosure to other protocols, such as the user datagram protocol (UDP). Primary IDP device 16 accordingly may require a minimum data size of UDP segments in order to identify the application associated with the UDP segments.

In one example, stateful inspection engine 28 includes a co-processor to perform application identification. The co-processor may continually receive input in the form of the packet flow and may constantly perform application identification on the packet flow. For each chunk of the packet flow, the co-processor may return the identity or identities the application(s) that the co-processor identified.

In general, protocol decoders 36 include a set of one or more protocol-specific software modules that process application-layer communications 33 and output transaction data 39 that identifies application-layer transactions. In particular, transaction data 39 indicate when a series of related application-layer communications between two peer devices start and end. Additionally the protocol decoders decompose a transaction into application layer elements on which attack signatures are matched and protocol anomalies are detected. In one example, one or more of protocol decoders 36 may be generic protocol decoders, such that the generic protocol decoders attempt to identify the application corresponding to the payload of an application-layer communication 33. An example of a generic protocol decoder is an algorithm that matches a predefined set of application fingerprints/signatures to the data being decoded and identifies the application based on a particular fingerprint match. For example, a generic protocol decoder may attempt to identify the application corresponding to the payload of an HTTP communication.

Many of protocol decoders 36 correspond to a different communication protocol or service. Examples of communication protocols that may be supported by protocol decoders 36 include the HyperText Transfer Protocol (HTTP), the File Transfer Protocol (FTP), the Network News Transfer Protocol (NNTP), the Simple Mail Transfer Protocol (SMTP), Telnet, Domain Name System (DNS), Gopher, Finger, the Post Office Protocol (POP), the Secure Socket Layer (SSL) protocol, the Lightweight Directory Access Protocol (LDAP), Secure Shell (SSH), Server Message Block (SMB) and other protocols. In one example, each of protocol decoders 36 receives data via a universal software interface, i.e., a software interface that processes application data in a manner that is independent from the underlying transport mechanism. In this way, protocol decoders may be swapped, reused and stacked (layered) when applied to a given packet flow.

After application of protocol decoders 36 to a given packet flow or individual packet, the protocol decoders return transaction data 39, application-layer elements 35, and protocol anomaly data 37 to stateful inspection engine 28. Stateful inspection engine 28 applies attack definitions 44 to protocol-specific application-layer elements 35 and anomaly data 37 to detect and prevent network attacks and other security risks.

In the event a security risk is detected, stateful inspection engine 28 outputs alert 41 to security management module 45 for logging and further analysis. In addition, stateful inspection engine 28 may take additional actions according to a policy definition, such as dropping the packets associated with the communication session, automatically closing the communication session or other action. If no security risk is detected for a given communication session, forwarding component 31 continues to forward the packet flows between the peers. Forwarding component 31 may, for example, maintain a routing table that stores routes in accordance with a topology of the enterprise network for use in forwarding the packet flows. When stateful inspection engine 28 determines that only one or an incomplete subset of a plurality of encapsulated sub-packets corresponds to a malicious network session, forwarding component 31 may forward a reassembled packet comprising only those sub-packets that do not correspond to malicious network sessions.

Stateful inspection engine 28 of primary IDP device 16 inspects packets received for each packet flow. For example, stateful inspection engine 28 may execute one or more DFAs for each application-layer transaction within a packet flow to determine whether the transaction corresponds to a network attack. In general, definitions of the DFAs are stored in attack definitions 44. Attack definitions 44 define one or more attacks, e.g., in the form of attack signatures, which correspond to regular expressions. By executing a DFA for a transaction of the packet flow, stateful inspection engine 28 determines whether the transaction represents an attack.

In general, a DFA comprises a plurality of states, an input alphabet, and a plurality of transitions defined from a first state to a second state based on a particular input character. Some examples of stateful inspection engine 28 utilize a nondeterministic finite automata (NFA), which enables lambda transitions between states, that is, enabling a transition between a first state and a second state without an input character. In general, a DFA (or NFA) "accepts" an input sequence when, starting from an initial start state, the DFA processes a sequence of tokens that cause the DFA to transition to and end in one of one or more accept states. In some examples, particular accept states of the DFA are defined as attack states, and when the DFA accepts an input sequence in an attack state, stateful inspection engine 28 determines that the packet flow comprising the one or more packets is malicious, while other accept states are defined as non-malicious accept states.

When stateful inspection engine 28 determines that one or more packets of a packet flow represent a network attack according to attack definitions 44, stateful inspection engine 28 performs one or more programmed responses. The programmed response may comprise, for example, dropping the attack packets, rate-limiting the packet flow, closing a network session associated with the packet flow, sending a close session message to either the client or the server (or both) of the network session, blocking future network connection requests by either the client or the server (permanently or for a defined period of time), or advertising the IP address of either or both of the client or server to other network devices to cause those network devices to block network sessions of the client or server and/or to close current network sessions of the client or server. When attack detection module 32 determines that a packet of a packet flow does not represent a network attack, attack detection module 32 passes the packet to the forwarding component 31, and the packet is forwarded toward the destination of the packet flow.

Moreover, the programmed response corresponds to a packet flow event, namely a "block" event. Accordingly, flow management module 34 generates a state update message indicating the corresponding packet flow, that a block event has occurred, and the programmed response that was taken. In this manner, following switchover or failover, backup IDP device 20 is able to continue enforcing the programmed response for the packet flow.

Figure 3:
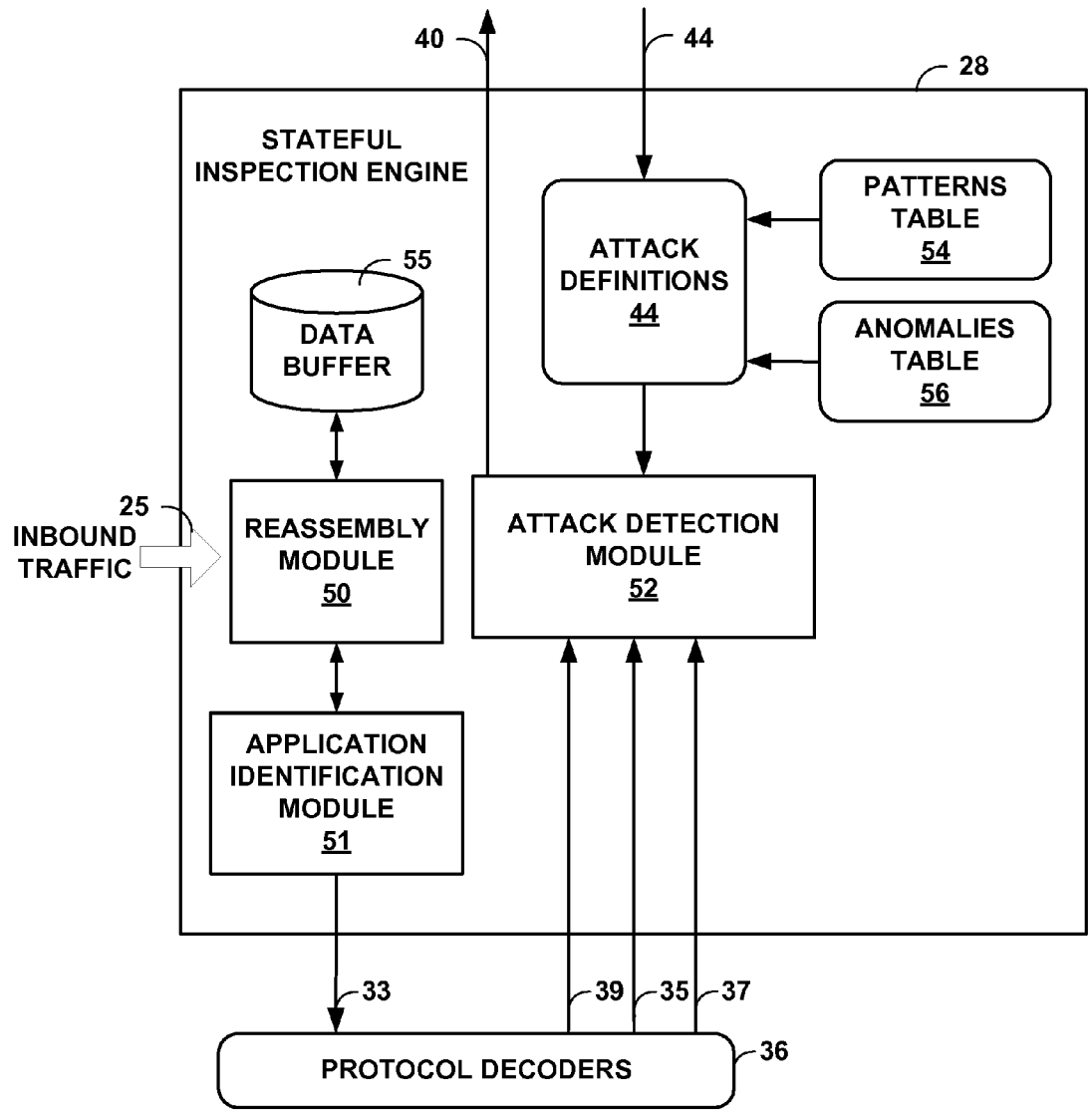
FIG. 3 is a block diagram illustrating an example of a stateful inspection engine of a primary IDP device.

FIG. 3 is a block diagram illustrating an example of stateful inspection engine 28 of primary IDP device 16 in further detail. In the example, stateful inspection engine 28 includes reassembly module 50, application identification module 51, attack detection module 52, patterns table 54, data buffer 55, anomalies table 56, and attack definitions 44.

Reassembly module 50 receives inbound network traffic 25 and reassembles application-layer communications 33 from the packet flows by removing any underlying transport information (e.g., layer four (L4) information and below). Reassembly module 50 forwards the reassembled application-layer communications 33 to application identification module 51, which determines an application for the network session and then sends the reassembled data to the appropriate protocol decoders 36 for processing.

Stateful inspection engine 28 stores attack definitions 44 received from security management module 45. Attack definitions 44 may be stored, for example, in a computer-readable medium, such as random access memory (RAM). Each of attack definitions 44 specifies a combination of one or more patterns specified within patterns table 54 and one or more protocol-specific anomalies specified within anomalies table 56.

When stateful inspection engine 28 receives a packet as part of a packet flow, reassembly module 50 buffers the packet in data buffer 55. In one example, data buffer 55 stores data as a sliding window. That is, data buffer 55 stores data until becoming full or reaching a specified required amount of minimum data for identification. When full, data buffer 55 discards certain data to make room for storing new data. In one example, data buffer 55 stores and discards data according to a first-in, first-out (FIFO) protocol wherein the first data to be stored is the first data to be discarded when data buffer 55 becomes full. In another example, data buffer 55 discards data according to a least recently used protocol wherein, when data buffer 55 is full, the packet flow which has been least recently used will be discarded to make room for new data to be stored.

In one example, reassembly module 50 associates packets in a packet flow of a network session according to the 5-tuple {source IP address, destination IP address, protocol, source port, destination port}. Other examples use other methods to associate packets with a particular packet flow or encapsulated packet flow. In one example, primary IDP device 16 comprises part of a network that utilizes virtual local area networks (VLANs). Accordingly, reassembly module 50 may associate packets in a packet flow according to a VLAN identifier, a source address, and a destination address.

Application identification module 51 attempts to identify an application associated with each of the intercepted communication sessions. In one embodiment, when stateful inspection engine 28 receives a packet as part of a packet flow, reassembly module 50 buffers the packet in data buffer 55. Reassembly module 50 attempts to reconstruct application layer data from the packets in data buffer 55. Application identification module 51 then attempts to identify the application associated with the packets in accordance with this reconstructed data. In other embodiments, application identification module 51 may use other techniques to attempt to identify the application associated with the communication session.

Application identification module 51 sends data from the packets to protocol decoders 36. When application identification module 51 is able to determine the application associated with the communication session, application identification module 51 sends data from the communication session to a corresponding one of protocol decoders 36. When application identification module 51 is not able to identify an application corresponding to the communication session, application identification module 51 sends the data from the communication session to a default protocol decoder of protocol decoders 36.

Protocol decoders 36 include decoders for various application-layer protocols that are used to extract transaction data 39, application-layer elements 35, and protocol anomaly data 37. In some examples, protocol decoders 36 use delimiters or a defined length of transactions to determine sections of the reassembled application-layer data that correspond to individual transactions. Moreover, when protocol decoders 36 detect the start of a new transaction for length-encoded protocols that define lengths of transactions, protocol decoders 36 signal flow management module 34 that a new transaction has been detected and a packet in which the beginning of the new transaction was detected. Accordingly, flow management module 34 calculates a sequence number corresponding to a packet that includes data for the start of a next new transaction and sends the calculated sequence number to backup IDP device 20 in a state update message.

Attack detection module 52 applies attack definitions 44 to application-layer elements 35 and protocol anomaly data 37 received from protocol decoders 36 that comprise individual application-layer transactions. The application-layer elements 35 may comprise application-layer elements of non-encapsulated packet flows or encapsulated packet flows (e.g., a communication session where a layer seven application-layer protocol is used to encapsulate another application-layer protocol). That is, attack detection module 52 may detect network attacks in either normal, non-encapsulated network traffic or in encapsulated packet flows. For each of compound attack definitions 44, attack detection module 52 selects the one or more patterns within patterns table 52 specified by the compound attack definition and determines whether any of application-layer elements 35 match the defined patterns. Each of the patterns may be defined as a respective "regular expression," which generally refers to a formula that is used to match patterns within data.

In addition to determining whether the defined patterns are present, attack detection module 52 may determine whether any protocol anomalies detected by protocol decoders 36 match the protocol anomalies specified by attack definitions 44. Attack detection module 52 determines that the corresponding packet flow matches one of attack definitions 44 when both the patterns and protocol anomalies specified by the attack definition are detected within a given communication session. Further, each of attack definitions 44 may specify whether the pattern matching and protocol anomalies are applied on a per-transaction basis or over the lifetime of the communication session.

In the event a security risk is detected, stateful inspection engine 28 outputs alert 41 to security management module 45 (FIG. 2) for logging and further analysis. Stateful inspection engine 28 may also direct forwarding component 31 to execute a programmed response to the security risk. The programmed response may include automatically dropping packets of the packet flow associated with the application-layer communications within which the network attack was detected. Stateful inspection engine 28 may also cause forwarding component 31 to send a close session message to one or more participants in the malicious network session as the programmed response.

Figure 4:
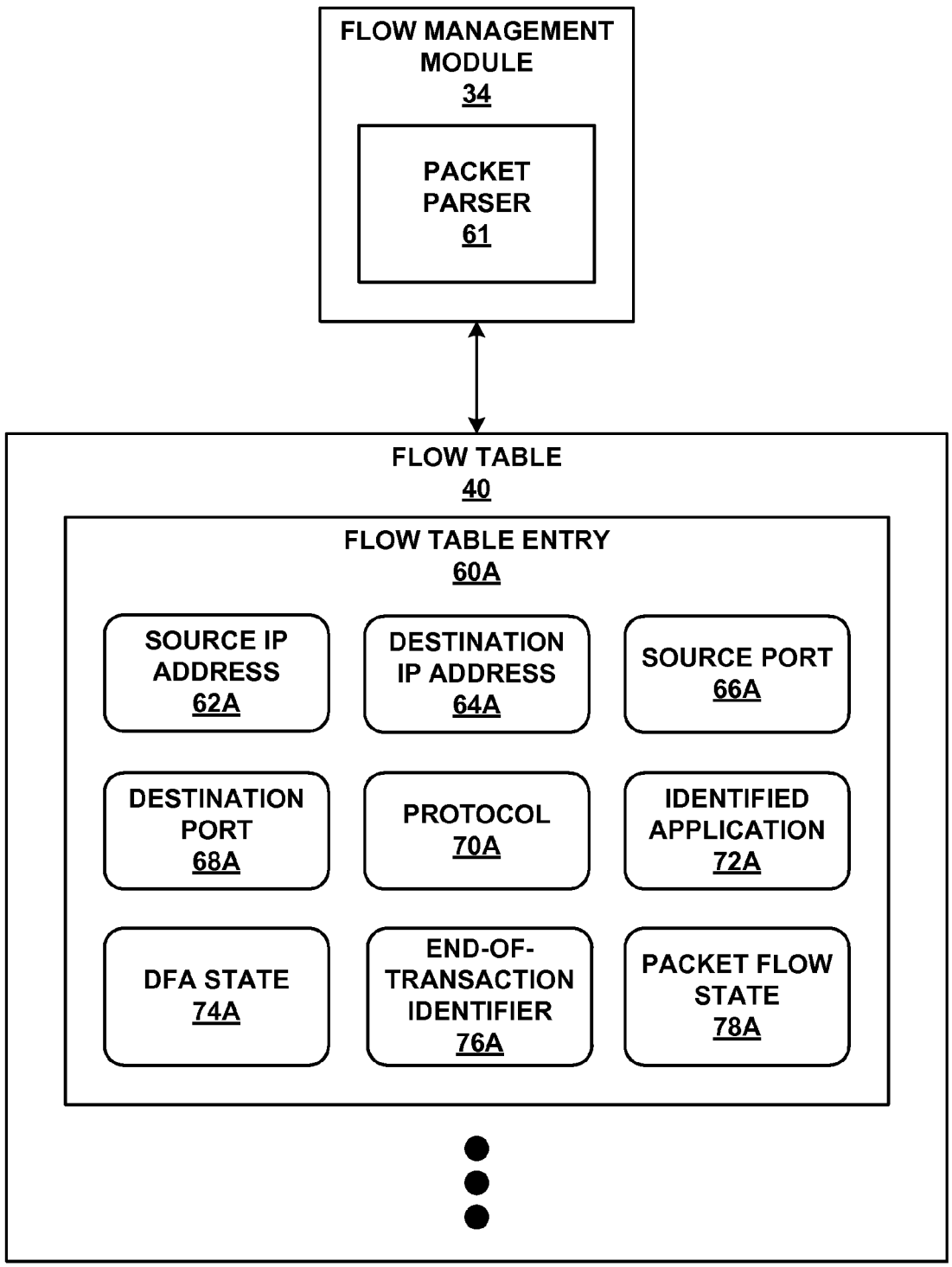
FIG. 4 is a block diagram illustrating example sub-components of a flow management module of a primary IDP device and an example flow table entry in a flow table of the primary IDP device.

FIG. 4 is a block diagram illustrating example sub-components of flow management module 34 and an example flow table entry 60A of flow table 40. In the example of FIG. 4, flow management module 34 comprises packet parser 61. When flow management module 34 first receives a packet, packet parser 61 parses the packet to determine whether the packet belongs to an existing packet flow or whether the packet represents a new packet flow. Packet parser 61 determines that SYN packets and SYN-ACK packets represent new packet flows. That is, packet parser 61 checks a SYN flag of a TCP header of a packet to determine whether the packet represents a new packet flow. In some examples, packet parser 61 determines that a packet having a 5-tuple {source IP address, destination IP address, source port, destination port, protocol} that does not match any entries of flow table 40 also represents a new (that is, unrecognized) packet flow.

When a packet represents a new packet flow, packet parser 61 extracts information regarding the new packet flow. Flow management module 34 creates a new entry in flow table 40 for the new packet flow and stores the extracted information in the new entry. In general, flow table 40 includes a plurality of flow table entries 60, although only one entry (flow table entry 60A) is shown in FIG. 4 for purposes of explanation. Flow table entry 60A includes data representative of a respective packet flow. In this example, flow table entry 60A includes values source IP address 62A, destination IP address 64A, source port 66A, destination port 68A, protocol 70A, identified application 72A, DFA state 74A, end-of-transaction identifier 76A, and application-layer IDP state 78A.

Packet parser 61 extracts the source IP address, destination IP address, source port, destination port, and protocol values from initial packets of a new network session, e.g., the SYN, SYN-ACK, and ACK packets forming the three-way handshake to initiate a new TCP session. After creating a new entry in flow table 40 representing a new packet flow and setting application-layer IDP state 78 of the new entry to "created," flow management module 34 sends one or more messages to backup IDP device 20 to indicate that a new packet flow has been identified. The messages also include the data used to create the new flow table entry. Accordingly, backup IDP device 20 creates an entry in a flow table local to backup IDP device 20 representative of the new packet flow.

When combined to form a five-tuple, the values source IP address 62A, destination IP address 64A, source port 66A, destination port 68A, and protocol 70A identify the packet flow to which flow table entry 60A corresponds. Accordingly, when flow management module 34 receives a packet, packet parser 61 extracts the source IP address, destination IP address, source port, destination port, and protocol of the packet to determine to which entry of flow table 40 the packet corresponds. Upon identifying an existing entry in flow table 40 for the packet, stateful inspection engine 38 extracts DFA state 74 from the corresponding entry 60 of flow table 40, executes the DFA using application-layer data of the packet (extracted from the packet by protocol decoders 36), and updates the value of DFA state 74 accordingly.

Protocol decoders 36 inspect each received packets to determine whether the packet represents part of a particular transaction, e.g., a current transaction or a new transaction, or a delimiter between transactions. In examples for which delimiters indicate a separation between transactions, protocol decoders 36 determines that a packet following a delimiter corresponds to a packet of a new transaction. Likewise, protocol decoders 36 determine that a packet preceded by a delimiter corresponds to a last packet of a transaction. In examples in which transactions are defined by a particular length, e.g., a set number of bytes, protocol decoders 36 determine that a packet having a sequence number that is one transaction-length greater than the sequence number of the beginning of a previous transaction corresponds to a new transaction. In some examples, protocol decoders 36 further determine whether an application layer element at the start of the new transaction is valid for the application protocol for the network session. For example, for HTTP, in addition to looking for new line/carriage return characters, protocol decoders 36 may also ensure that the start of the new transaction is a GET, POST, HEAD, or other HTTP transaction to confirm that the delimiter indeed was intended to separate transactions, and was not part of the content of the previous transaction. Upon detecting a new transaction, in examples that use defined lengths of transactions, flow management module 34 calculates the sequence number of the next transaction, generates a state update message that includes the sequence number of the next transaction, and sends the state update message to backup IDP device 20.

As discussed above, a DFA comprises a plurality of states and transitions between the states based on input characters. Stateful inspection engine 28 (FIG. 2) records a current DFA state for a current transaction in DFA state 74A. Accordingly, when a subsequent packet of the current transaction is received and processed, stateful inspection engine 28 processes the data of the packet and updates the value of DFA state 74A accordingly. In some examples, stateful inspection engine 28 recognizes a plurality of different DFAs. In such examples, stateful inspection engine 28 also records an identifier of a DFA to which the current transaction corresponds in DFA state 74A, e.g., as a tuple represented by {DFA_identifier, DFA_state}.

When a received packet is part of an existing (that is, recognized) packet flow, protocol decoders 36 extract one or more characters from the application-layer payload of the packet and passes the characters to stateful inspection engine 28 (FIG. 2). Stateful inspection engine 28 retrieves the current DFA and current DFA state from DFA state 74. Stateful inspection engine 28 then processes the input characters received from protocol decoder 36 to determine a resulting state in the corresponding DFA and records the DFA state in DFA state 74. When the packet is a last packet of the transaction, e.g., as determined by protocol decoders 36, stateful inspection engine 28 determines whether the last DFA state is an "accept" state (e.g., to determine whether the transaction represents an attack, an error, or an acceptable input sequence) and updates DFA state 74 to reflect a DFA start state.

When the transaction is determined to represent an attack, flow management module 34 sets the value of application-layer IDP state 78 of the corresponding entry 60 of flow table 40 to "blocked," and, in some examples, also records one or more programmed responses that were taken with respect to the packet flow, the source, and/or the destination of the packet flow in application-layer IDP state 78 of the corresponding flow table entry 60 of flow table 40. As discussed above, flow management module 34 also generates a state update message to indicate that the packet flow has been blocked, as well as one or more programmed responses that have been taken with respect to the packet flow, the source, and/or the destination.

Figure 5:
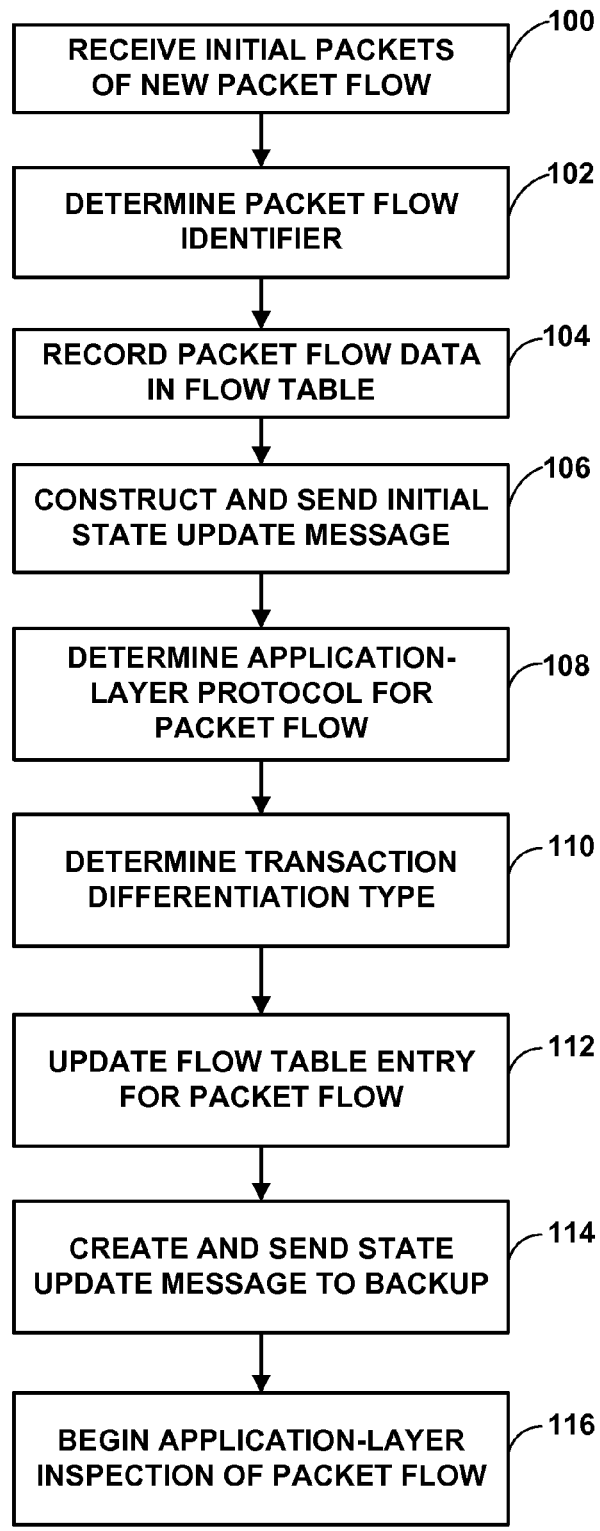
FIG. 5 is a flowchart illustrating an example method for creating a new flow table entry upon receiving a new packet flow and for updating a backup IDP device with information for the new packet flow.

FIG. 5 is a flowchart illustrating an example method for creating a new flow table entry upon receiving a new packet flow. Initially, primary IDP device 16 receives packets indicative of a new packet flow (100). In general, primary IDP device 16 determines that a packet flow is a new packet flow upon receiving a SYN packet of the packet flow from a client, e.g., one of source devices 12 (FIG. 1), destined for a server, e.g., one of destination devices 24 (FIG. 1). Primary IDP device 16 also receives a SYN-ACK packet from the server in response to the SYN packet, and an ACK packet from the client in response to the SYN-ACK packet. In general, the SYN, SYN-ACK, and ACK packets are referred to as the three-way handshake packets. It should be noted that the SYN packet and the SYN-ACK packet belong to different packet flows, but to the same network session. Primary IDP device 16 associates the two packet flows with the same network session using source and destination IP addresses, source and destination port numbers, and a protocol of each packet flow.

In particular, packet parser 61 parses received packets to determine whether the SYN and/or ACK flags of these packets are set. Packet parser 61 determines that packets with the SYN and/or ACK flags set are three-way handshake packets of respective new packet flows of a new network session. Packet parser 61 parses three-way handshake packets to determine, for the packet flows associated with the three-way handshake packets, a source of the packet flow including a source IP address and a source port, a destination of the packet flow including a destination IP address and a destination port, and an identified protocol of the packet flow (102). After identifying this information of a new packet flow, flow management module 34 constructs a new entry 60 of flow table 40 to record the identified 5-tuple and sets the application-layer IDP state to "created" (104). Flow management module 34 also constructs a state update message that includes the 5-tuple and sends the state update message to backup IDP device 20 (106), which constructs a similar new entry in a local flow table of backup IDP device 20.

Next, primary IDP device 16 executes an application identification process to determine an application-layer protocol for the packet flow (108). In some examples, determining the application-layer protocol further comprises performing application identification to identify an application corresponding to the packet flow, e.g., a web browser, an e-mail client, an FTP (file transfer protocol) client, a peer-to-peer file sharing client, or other network application. Primary IDP device 16 also determines how transactions are differentiated for the packet flow (110). In some examples, the determined application-layer protocol itself defines how transactions are differentiated, e.g., whether the transactions are delimited using new line, line feed, and/or carriage return characters, or whether transactions are of a defined length, e.g., for binary protocols.

The transaction differentiation type corresponds to at least one of a delimiter or a transaction length, and is determined as a factor of the application-layer protocol determined to correspond to the packet flow, as well as the identified application corresponding to the packet flow. When the transaction differentiation type corresponds to a delimiter, flow management module 34 also determines what delimiters are used to demarcate transactions, e.g., new line characters, carriage return characters, or the like. When the transaction differentiation type corresponds to a transaction length, flow management module 34 also determines the length of the transactions, e.g., as a number of bytes. In some examples, each transaction is of the same length, while in other transactions, the length of each transaction is dynamic and signaled, e.g., with a transaction header. In any case, after identifying the application-layer protocol and transaction differentiation type, flow management module 34 updates the corresponding flow table entry 60 in flow table 40 for the packet flow to indicate the identified application-layer protocol and the transaction differentiation type (112).

Flow management module 34 also creates a state update message for backup IDP device 20 including the identified application-layer protocol and the transaction differentiation type and sends the state update message to backup IDP device 20 via backup device network interface 42 across data link 18 (114). Protocol decoders 36 then begin inspection of application-layer data of packets of the new packet flow (116).

Figure 6:
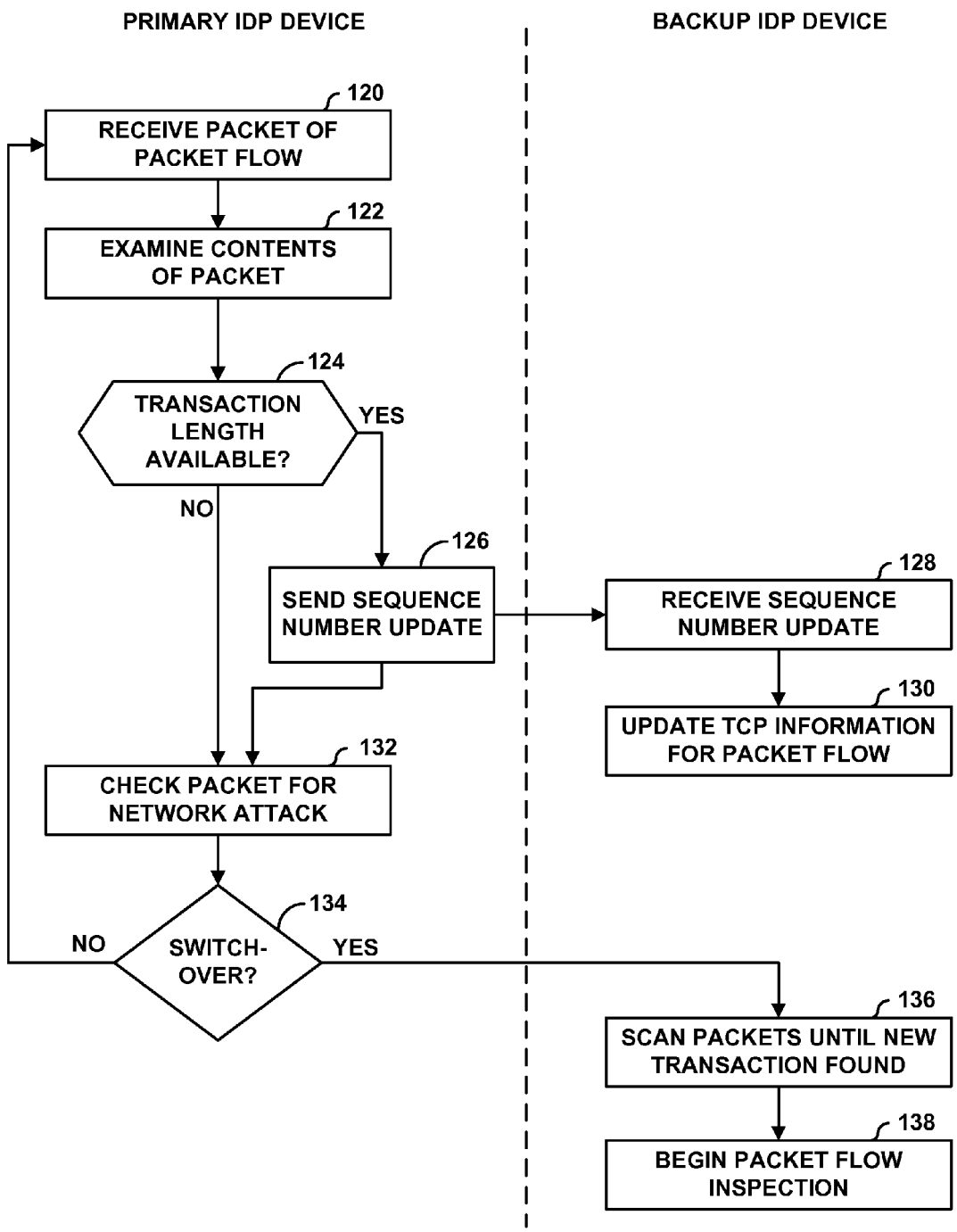
FIG. 6 is a flowchart illustrating an example method for sending sequence number updates from a primary IDP device to a backup IDP device, for examples corresponding to length-encoded application-layer protocols having transactions of defined lengths.

FIG. 6 is a flowchart illustrating an example method for sending state updates from primary IDP device 16 to backup IDP device 20 for packet flows having length-encoded application-layer protocols. Initially, primary IDP device 16 receives a packet of an existing (recognized) packet flow (120). Flow management module 34 then inspects the packet to retrieve TCP information and updates the flow table entry corresponding to the packet flow in flow table 40 based on information retrieved from the packet (122). For example, packet parser 61 extracts the current sequence number and flow management module 34 updates the value of the end-of-transaction identifier value 76 in the corresponding flow table entry 60 of flow table 40 to reflect the current sequence number value.

Protocol decoders 36 then determine whether the packet represents that a current transaction has been completed (124). That is, protocol decoders 36 determine whether the packet corresponds to a first packet of a next transaction by determining whether the sequence number of the packet matches a previously determined sequence number that corresponds to the first packet of a next transaction.

When flow management module 34 determines that the transaction length value is available (e.g., can be determined or has been explicitly defined) ("YES" branch of 124), flow management module 34 constructs a state update message including a sequence number of a next transaction for the packet flow and sends the state update message to backup IDP device 20 via backup device network interface 42 across data link 18 (126). In particular, primary IDP device 16 calculates a sequence number corresponding to the next transaction for the packet flow based on the current sequence number and the length of the current transaction. The state update message includes an identification of the packet flow associated with the update (e.g., the 5-tuple {source IP address, destination IP address, source port, destination port, and protocol} of the packet flow) and the sequence number for the first packet of the next transaction.

After receiving the sequence number update from primary IDP device 16 (128), backup IDP device 20 updates the TCP information associated with the packet flow (130). When backup IDP device 20 receives an update message, backup IDP device 20 identifies an entry in a local flow table of backup IDP device 20 corresponding to the packet flow associated with the update message (e.g., using the 5-tuple {source IP address, destination IP address, source port, destination port, and protocol}) and updates the information of the local flow table entry. In particular, backup IDP device 20 updates the sequence number for the next transaction in the local flow table. Primary IDP device 16 also inspects the packet to determine whether the packet represents a network attack (132). In some examples, the packet inspection occurs before checking whether the transaction has been completed.

When a switchover or failover does not occur ("NO" branch of 134), primary IDP device 16 awaits another packet and then repeats the steps described above. However, when a switchover or failover occurs, backup IDP device 20 becomes active as a primary IDP device. Backup IDP device 20 then awaits the start of a new transaction, scanning packets of the packet flow until a new transaction is identified (136). In particular, as the method of FIG. 6 corresponds to examples using defined length transactions, backup IDP device 20 determines whether the sequence number of a current packet is equal to the sequence number from the last state update message received from primary IDP device 16. When the sequence number of a received packet is equal to the last state update message, backup IDP device 20, acting as a primary IDP device, begins inspection of the packet flow (138).

Figure 7:
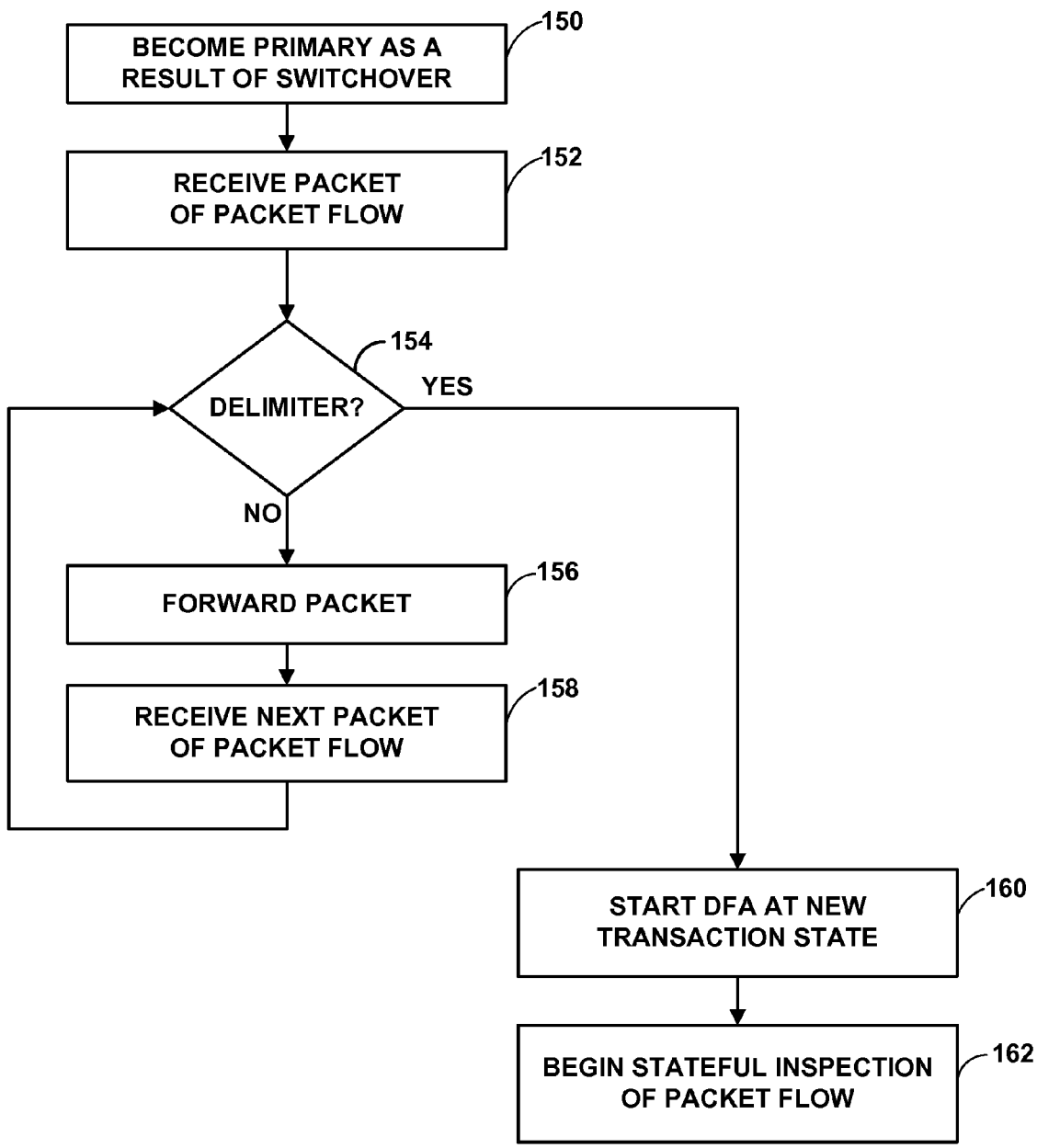
FIG. 7 is a flowchart illustrating an example method for a backup IDP device to become active following failover of an active IDP device when transactions are differentiated by delimiter values.

FIG. 7 is a flowchart illustrating an example method for backup IDP device 20 to begin stateful inspection of packet flows following switchover or failover from primary IDP device 16 when delimiters are used to differentiate transactions. Initially, backup IDP device 20 becomes active as a result of switchover (150). Backup IDP device 20 may determine that switchover or failover has occurred in a number of ways. In various examples, backup IDP device 20 becomes active following an instruction from primary IDP device 16 to become active or when backup IDP device 20 does not receive a keepalive message from primary IDP 16 within an expected amount of time.

In any case, after backup IDP device 20 becomes active, backup IDP device 20 begins receiving packets of packet flows previously inspected by primary IDP device 16 (152). For a received packet of the packet flow, backup IDP device 20 determines whether the packet includes a delimiter, e.g., a new line character or a carriage return character (154). When the packet does not include a delimiter ("NO" branch of 154), backup IDP device 20 forwards the packet (156) and receives a next packet of the packet flow (158). Backup IDP device 20 then again determines whether this next packet includes a delimiter (154).

Backup IDP device 20 continues the loop represented by steps 154-158 until a packet is received that includes a delimiter ("YES" branch of 154). In some examples, backup IDP device 20 further performs a check to confirm that the application layer element following the delimiter conforms to a new transaction, to confirm that the delimiter was not intended as part of the previous transaction but was indeed intended to indicate the end of the transaction and the start of a new transaction. Upon receiving such a packet, backup IDP device 20 starts stateful inspection for the new transaction of the packet flow at a start state representative of a new transaction (160). In particular, backup IDP device 20 selects the DFA based on an identified application or application-layer protocol, as indicated by a state update message from primary IDP device 16, and anchors the DFA at the beginning of the new transaction. Backup IDP device 20 then begins application-layer inspection of packets of the packet flow (162).

Figure 8:
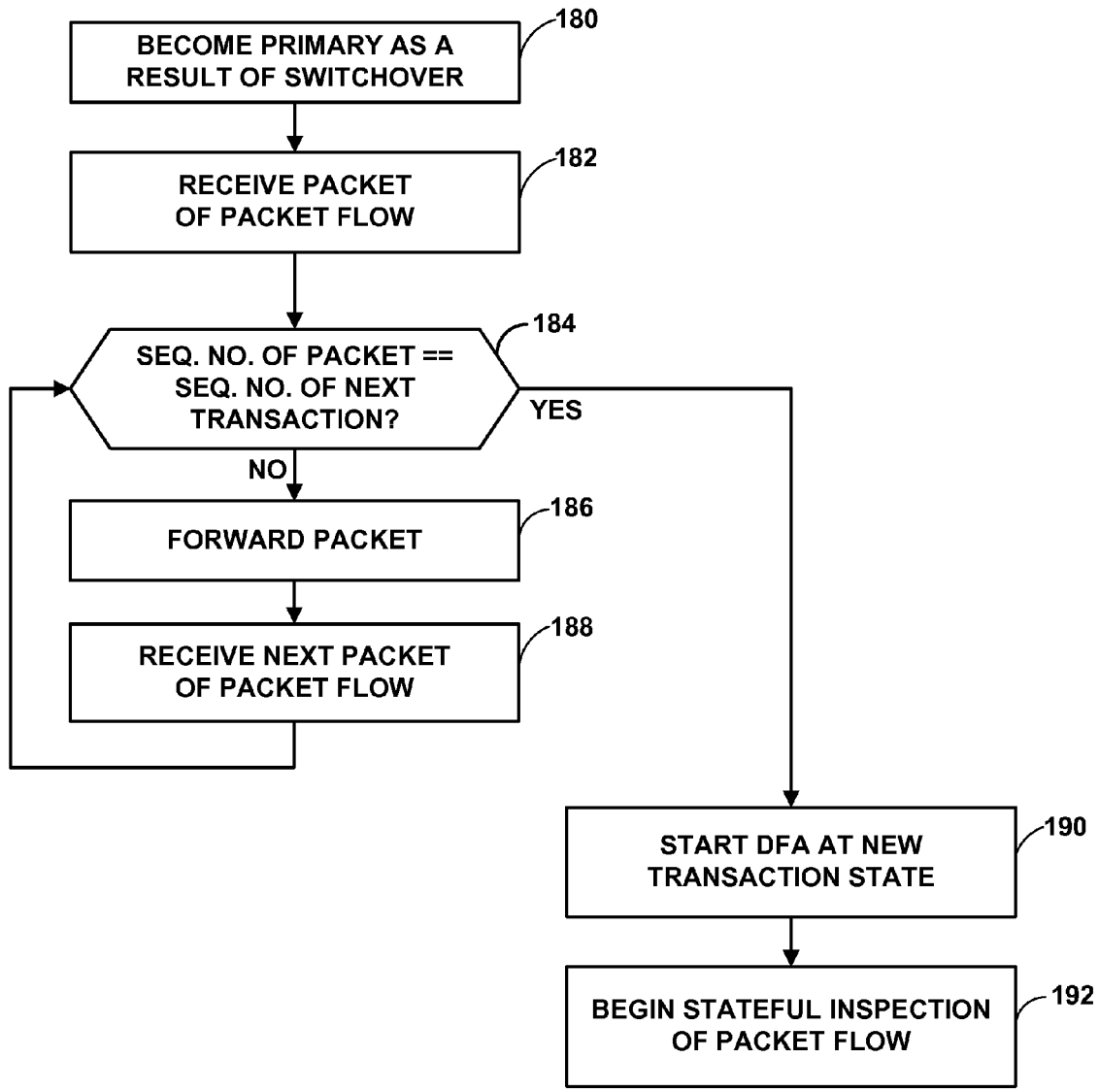
FIG. 8 is a flowchart illustrating an example method for a backup IDP device to become active following failover of an active IDP device when transactions have defined transaction lengths.

FIG. 8 is a flowchart illustrating another example method for backup IDP device 20 to begin stateful inspection of packet flows following switchover or failover from primary IDP device 16 when transactions have defined lengths in order to differentiate transactions. Initially, backup IDP device 20 becomes active as a result of switchover (180). Backup IDP device 20 may determine that switchover or failover has occurred in a number of ways, as described above.

After backup IDP device 20 becomes active, backup IDP device 20 begins receiving packets of packet flows previously inspected by primary IDP device 16 (182). It is assumed that backup device 20 has previously received a state update message from primary IDP device 16 that indicates the sequence number of the first packet of the next transaction of the packet flow. Accordingly, backup IDP device 20 checks the sequence number of each packet of the packet flow to determine whether the sequence number matches the received sequence number of the next transaction (184). If not ("NO" branch of 184), backup IDP device 20 forwards the packet (186) and awaits receipt of the next packet of the packet flow (188).

Backup IDP device 20 continues the loop represented by steps 184-188 until a packet is received that has a sequence number equal to the sequence number of the first packet of the next transaction ("YES" branch of 186). Upon receiving such a packet, backup IDP device 20 starts stateful inspection for the new transaction of the packet flow at a start state representative of a new transaction (190). In particular, backup IDP device 20 selects the DFA based on an identified application or application-layer protocol, as indicated by a state update message from primary IDP device 16, and anchors the DFA at the beginning of the new transaction. Backup IDP device 20 then begins stateful inspection of packets of the packet flow (192).

Although generally described with respect to intrusion detection and prevention devices for purposes of example, it should be understood that the techniques of this disclosure can be implemented in any pair of stateful primary and backup devices in a high availability cluster, that is, any two network devices configured in cluster mode that are aware of session state. For example, other stateful security devices, e.g., firewalls, intrusion detection systems, intrusion prevention systems, data loss prevention (DLP) systems, web security gateways and extensible devices (such as routers and gateways) including a security card that performs stateful packet inspection, may be configured to perform the techniques of this disclosure. Moreover, non-security devices in a high availability environment may also be configured perform the techniques of this disclosure. For example, URL filtering devices configured in a cluster mode for providing high availability may be configured to implement the techniques of this disclosure. Other examples of non security devices include Traffic Monitoring systems, application performance management systems and lawful intercept systems.

Descriptions of devices as "primary" and "backup" (or "active" and "passive") should be understood as indications of whether a particular device is actively or passively monitoring traffic of a particular packet flow. A device designated as "primary" or "backup" is not necessarily an indication that the device is "primary" or "backup" for all packet flows. In some arrangements, referred to as "active/passive" arrangements, one device is active, or primary, with respect to all packet flows, while another device is passive, or backup, and upon failover, the passive device becomes active. On the other hand, in other arrangements, referred to as "active/active" arrangements, a first device is active with respect to a first plurality of packet flows, a second device is active with respect to a second plurality of packet flows, the first device is passive with respect to the second plurality of packet flows, and the second device is passive with respect to the first plurality of packet flows. In this manner, the first device and the second device are each active with respect to at least one packet flow and passive with respect to at least one packet flow, and the first and second devices provide backup for each other. The techniques of this disclosure are generally applicable to both active/passive arrangements and active/active arrangements.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various examples have been described. These and other examples are within the scope of the following claims.

What is claimed is:

1. A method comprising:
    receiving, by a backup network device of a high-availability cluster, a state update message from a primary network device of the high-availability cluster, wherein the state update message indicates a network session being inspected by the primary network device and an identified application-layer protocol for the network session;
    in response to determining, by the backup network device, that the primary network device has switched over or failed over to the backup network device, receiving, by the backup network device, a packet of the network session, the packet comprising application-layer data;
    detecting a beginning of a new transaction from the application-layer data of the packet; and
    processing the application-layer data of the network session that include and follow the beginning of the new transaction without performing stateful processing of application-layer data that precede the beginning of the new transaction.

2. The method of claim 1, further comprising receiving, by the backup network device, a state update message that indicates a sequence number of a next transaction of the network session prior to determining that the primary network device has switched over or failed over, and wherein detecting the beginning of the new transaction comprises:
    determining a sequence number of the packet;
    comparing the sequence number of the packet to the sequence number of the next transaction from the state update message; and
    determining that the packet includes the beginning of the new transaction when the sequence number of the received packet matches the sequence number of the next transaction from the state update message.

3. The method of claim 2, wherein detecting the beginning of a new transaction comprises determining that the application-layer data comprises a delimiter value that immediately precedes the beginning of the new transaction.

4. The method of claim 3, wherein the delimiter value comprises at least one of a new line character, a line feed character, and a carriage return character.

5. The method of claim 2, wherein processing the packets comprises inspecting the application-layer data of the network session to determine whether any portion of the application-layer data corresponds to a network attack.

6. A backup network device of a high-availability cluster configured to operate in a cluster mode, the backup network device comprising:
    one or more hardware-based network interfaces configured to receive a state update message from a primary network device of a high-availability cluster of the backup network device, wherein the state update message indicates a network session being inspected by the primary network device and an identified application-layer protocol for the network session, and in response to determining that the primary network device has switched over or failed over to the backup network device, to receive a packet of the network session, the packet comprising application-layer data;
    a protocol decoder configured to detect a beginning of a new transaction from the application-layer data of the packet; and a hardware-based control unit, comprising a hardware processor, to process the application-layer data of the network session that include and follow the beginning of the new transaction without performing stateful processing of application-layer data that precede the beginning of the new transaction.

7. The backup network device of claim 6,
wherein the one or more hardware-based network interfaces are configured to receive a state update message that indicates a sequence number of a next transaction of the network session prior to the determination that the primary network device has switched over or failed over, and
wherein to detect the beginning of a new transaction, the protocol decoder is configured to determine a sequence number of the packet, compare the sequence number of the packet to the sequence number of the next transaction from the state update message, and determine that the packet includes the new transaction when the sequence number of the packet matches the sequence number of the next transaction from the state update message.

8. The backup network device of claim 7, wherein to detect the beginning of a new transaction, the protocol decoder is configured to determine whether the application-layer data includes a delimiter value that immediately precedes the beginning of the new transaction.

9. The backup network device of claim 8, wherein the delimiter value comprises at least one of a new line character, a line feed character, and a carriage return character.

10. The backup network device of claim 7, further comprising an attack detection module configured to process the packets, wherein the attack detection module inspects the application-layer data of the network session to determine whether any portion of the application-layer data corresponds to a network attack.

11. A computer-readable storage medium encoded with instructions for causing a programmable processor of a backup network device of a high availability cluster to:
receive a state update message from a primary network device of the high-availability cluster, wherein the state update message indicates a network session being inspected by the primary network device and an identified application-layer protocol for the network session;
in response to determining that the primary network device has switched over or failed over to the backup network device, receive a packet of the network session, the packet comprising application-layer data;
detect a beginning of a new transaction from the application-layer data of the packet; and
process the application-layer data of the network session that include and follow the beginning of the new transaction without performing stateful processing of application-layer data that precede the beginning of the new transaction.

12. The computer-readable storage medium of claim 11, further comprising instructions to receive a state update message that indicates a sequence number of a next transaction of the network session prior to the determination that the primary network device has switched over or failed over, and wherein the instructions to detect the beginning of a new transaction comprise instructions to:
determine a sequence number of the packet;
compare the sequence number of the packet to the sequence number of the next transaction from the state update message; and
determine that the packet includes a new transaction when the sequence number of the packet matches the sequence number of the next transaction from the state update message.

13. The computer-readable storage medium of claim 12, wherein the instructions to detect the beginning of a new transaction comprise instructions to determine that the application-layer data comprises a delimiter value that immediately precedes the beginning of the new transaction.

14. The computer-readable storage medium of claim 13, wherein the delimiter value comprises at least one of a new line character, a line feed character, and a carriage return character.

15. The computer-readable storage medium of claim 12, wherein the instructions to process the packets comprise instructions to inspect the application-layer data of the network session to determine whether any portion of the application-layer data corresponds to a network attack.

16. A method comprising:
receiving, by a primary network device in a high availability environment, a packet of a network session, the packet comprising application-layer data;
detecting a beginning of a new transaction from the application-layer data of the packet;
calculating a sequence number corresponding to a first packet of a next transaction of the network session, wherein the next transaction follows the new transaction; and
forwarding a state update message that includes the calculated sequence number to a backup network device for the primary network device in the high availability environment.

17. The method of claim 16, wherein detecting the beginning of the new transaction comprises:
calculating, prior to receiving the packet, a sequence number for a first packet of the new transaction;
after receiving the packet, comparing the sequence number of the received packet to the calculated sequence number for the first packet of the new transaction; and
determining that the sequence number of the received packet matches the calculated sequence number for the first packet of the new transaction.

18. The method of claim 17, further comprising inspecting, by the primary network device, the application-layer data of the network session to determine whether any portion of the application-layer data represents a network attack.

19. A primary network device of a high availability cluster configured to operate in a cluster mode, the primary network device comprising:
one or more hardware-based network interfaces configured to receive a packet of a network session, the packet comprising application-layer data; and
one or more processors comprising hardware, wherein the one or more processors implement a protocol decoder unit and a flow management unit, wherein the protocol decoder unit is configured to detect a beginning of a new transaction from the application-layer data of the packet, and wherein the flow management unit is configured to calculate a sequence number corresponding to a first packet of a next transaction of the network session, wherein the next transaction follows the new transaction, and
wherein the one or more hardware-based network interfaces are configured to forward a state update message that includes the calculated sequence number to a backup network device for the primary network device in the high availability cluster.

20. The primary network device of claim 19, wherein the primary network device comprises a primary intrusion detection and prevention (IDP) device.

21. A computer-readable storage medium encoded with instructions for causing a programmable processor of a primary network device of a high availability cluster to:
   receive a packet of a network session, the packet comprising application-layer data;
   detect a beginning of a new transaction from the application-layer data of the packet;
   calculate a sequence number corresponding to a first packet of a next transaction of the network session, wherein the next transaction follows the new transaction; and
   forward a state update message that includes the calculated sequence number to a backup network device for the primary network device in the high availability environment.

22. A high-availability cluster system comprising:
   a primary network device comprising hardware; and
   a backup network device for the primary network device, wherein the backup network device comprises hardware,
   wherein the primary network device is configured to receive a packet of a network session, the packet comprising application-layer data, detect a beginning of a new transaction from the application-layer data of the packet, calculate a sequence number corresponding to a first packet of a next transaction of the network session, wherein the next transaction follows the new transaction, and forward a state update message that includes the calculated sequence number to the backup network device, and
   wherein the backup network device is configured to receive a state update message from a primary network device of a high-availability cluster of the backup network device, wherein the state update message indicates a network session being inspected by the primary network device and an identified application-layer protocol for the network session, and in response to determining that the primary network device has switched over or failed over to the backup network device, to receive a packet of the network session, the packet comprising application-layer data, detect a beginning of a new transaction from the application-layer data of the packet, and process the application-layer data of the network session that include and follow the beginning of the new transaction without performing stateful processing of application-layer data that precede the beginning of the new transaction.

23. The high-availability cluster system of claim 22, wherein the primary network device comprises a first intrusion detection and prevention (IDP) device, and wherein the backup network device comprises a second IDP device.

\* \* \* \* \*